US011102556B2

(12) United States Patent
Sandholm et al.

(10) Patent No.: US 11,102,556 B2
(45) Date of Patent: *Aug. 24, 2021

(54) AUTOMATED ALLOCATION OF MEDIA CAMPAIGN ASSETS TO TIME AND PROGRAM IN DIGITAL MEDIA DELIVERY SYSTEMS

(71) Applicant: Optimized Markets, Inc., Pittsburgh, PA (US)

(72) Inventors: Tuomas Wilhelm Sandholm, Pittsburgh, PA (US); Fei Peng, Pittsburgh, PA (US); John Paul Dickerson, Pittsburgh, PA (US)

(73) Assignee: Optimized Markets, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,534

(22) Filed: Apr. 13, 2020

(65) Prior Publication Data

US 2020/0245035 A1    Jul. 30, 2020

Related U.S. Application Data

(63) Continuation of application No. 16/154,139, filed on Oct. 8, 2018, now Pat. No. 10,623,825, which is a
(Continued)

(51) Int. Cl.
*H04N 21/81* (2011.01)
*H04N 21/442* (2011.01)
(Continued)

(52) U.S. Cl.
CPC ......... *H04N 21/812* (2013.01); *H04N 21/252* (2013.01); *H04N 21/262* (2013.01);
(Continued)

(58) Field of Classification Search
CPC ......... H04N 21/23424; H04N 21/2407; H04N 21/8358; H04N 21/812; H04N 21/44222; H04N 21/6582; H04N 21/262
See application file for complete search history.

(56) References Cited

U.S. PATENT DOCUMENTS 5,740,549 A    4/1998  Reilly et al.
5,937,390 A    8/1999  Hyodo
(Continued)

FOREIGN PATENT DOCUMENTS

JP    200602149      1/2006
WO   2006076581 A2   7/2006
WO   2007092050 A2   8/2007

OTHER PUBLICATIONS

Bollaparagda et al., "Managing On-Air Ad Inventory in Broadcast Television", IIE Transactions, 40(12) published online Oct. 2008.
Gaur et al., "Conflict Resolution in the Scheduling of Television Commercials", Operations Research, INFORMS, vol. 57, No. 5, Sep.-Oct. 2009, pp. 1098-1105.
Turner et al., "Scheduling of Dynamic In-Game Advertising", Operations Research, INFORMS, vol. 59, No. 1, Jan.-Feb. 2011, pp. 1-16.
Turner et al., "The Planning of Guaranteed Targeted Display Advertising", Operations Research, INFORMS, vol. 60, No. 1, Jan.-Feb. 2012, pp. 18-33.
(Continued)

*Primary Examiner* — Nnenna N Ekpo
(74) *Attorney, Agent, or Firm* — Fox Rothschild LLP

(57) ABSTRACT

A system for automatically managing the delivery of media assets allocates the media assets to delivery slots of a media delivery servers so that consumers will receive the media assets when they consume digital media programming at times that correspond to the delivery slots. An example is the automated allocation of sponsored videos to television programs airing on a particular afternoon. The system includes data stores and a campaign manager system. The campaign manager system will automatically allocate digital media assets to delivery slots in a campaign to generate scheduling files that media servers will use to present the allocated media assets to consumers during the assigned delivery slots via media consumption devices.

20 Claims, 10 Drawing Sheets

Related U.S. Application Data continuation of application No. 15/634,072, filed on Jun. 27, 2017, now Pat. No. 10,097,904, which is a continuation of application No. 15/000,742, filed on Jan. 19, 2016, now Pat. No. 9,699,502.

(60) Provisional application No. 62/104,685, filed on Jan. 16, 2015.

(51) Int. Cl.
| | |
|---|---|
| *H04N 21/482* | (2011.01) |
| *H04N 21/25* | (2011.01) |
| *H04N 21/466* | (2011.01) |
| *H04N 21/658* | (2011.01) |
| *H04N 21/262* | (2011.01) |
| *H04N 21/2668* | (2011.01) |
| *H04N 21/458* | (2011.01) |
| *H04N 21/472* | (2011.01) |

(52) U.S. Cl.
CPC ....... *H04N 21/2668* (2013.01); *H04N 21/442* (2013.01); *H04N 21/44222* (2013.01); *H04N 21/4583* (2013.01); *H04N 21/4667* (2013.01); *H04N 21/47202* (2013.01); *H04N 21/482* (2013.01); *H04N 21/6582* (2013.01)

(56) References Cited

U.S. PATENT DOCUMENTS

| | | |
|---|---|---|
| 5,937,392 A | 8/1999 | Alberts |
| 5,999,912 A | 12/1999 | Wodarz et al. |
| 6,009,409 A | 12/1999 | Adler et al. |
| 6,208,982 B1 | 3/2001 | Allen, Jr. et al. |
| 6,253,189 B1 | 6/2001 | Feezell et al. |
| 6,324,519 B1 | 11/2001 | Eldering |
| 6,401,075 B1 | 6/2002 | Mason et al. |
| 6,625,578 B2 | 9/2003 | Spaur et al. |
| 6,654,725 B1 | 11/2003 | Langheinrich et al. |
| 6,876,974 B1 | 4/2005 | Marsh et al. |
| 6,898,572 B2 | 5/2005 | Ohyama |
| 6,907,566 B1 | 6/2005 | McElfresh et al. |
| 7,038,637 B1 | 5/2006 | Eller et al. |
| 7,039,599 B2 | 5/2006 | Merriman et al. |
| 7,054,831 B2 | 5/2006 | Koenig |
| 7,085,732 B2 | 8/2006 | Gould |
| 7,124,091 B1 | 10/2006 | Khoo et al. |
| 7,222,099 B2 | 5/2007 | Forsythe et al. |
| 7,334,251 B2 | 2/2008 | Rodriguez et al. |
| 7,406,434 B1 | 7/2008 | Chang et al. |
| 7,593,905 B2 | 9/2009 | He |
| 7,689,453 B2 | 3/2010 | Ramsey et al. |
| 7,698,178 B2 | 4/2010 | Chu |
| 7,734,503 B2 | 6/2010 | Agarwal et al. |
| 7,831,472 B2 | 11/2010 | Yufik |
| 7,881,959 B2 | 2/2011 | Ramsey et al. |
| 7,949,562 B2 | 5/2011 | Collins |
| 8,131,594 B1 | 3/2012 | Yehoshua et al. |
| 8,170,913 B1 | 5/2012 | Baluja |
| 8,185,421 B2 | 5/2012 | Fertig et al. |
| 8,190,460 B1 | 5/2012 | Andersen et al. |
| 8,229,870 B2 | 7/2012 | Bagley et al. |
| 8,238,540 B1 | 8/2012 | Duva et al. |
| 8,249,930 B2 | 8/2012 | Badger et al. |
| 8,255,949 B1 | 8/2012 | Bayer et al. |
| 8,285,577 B1 | 10/2012 | Galperin et al. |
| 8,311,884 B2 | 11/2012 | Yang |
| 8,311,886 B2 | 11/2012 | Vijay et al. |
| 8,332,268 B2 | 12/2012 | Carruthers et al. |
| 8,352,981 B1 | 1/2013 | Oztaskent |
| 8,364,541 B2 | 1/2013 | Roth |
| 8,364,616 B2 | 1/2013 | Bhatnagar |
| 8,374,912 B2 | 2/2013 | Paroz et al. |
| 8,423,407 B2 | 4/2013 | Schepers et al. |
| 8,434,104 B2 | 4/2013 | Weihs et al. |
| 8,478,643 B1 | 7/2013 | Koningstein |
| 8,478,644 B1 | 7/2013 | Baluja |
| 8,489,460 B2 | 7/2013 | Kamath |
| 8,503,635 B2 | 8/2013 | Metz et al. |
| 8,515,814 B2 | 8/2013 | Boutilier et al. |
| 8,516,515 B2 | 8/2013 | Zigmond et al. |
| 8,533,044 B2 | 9/2013 | Oren et al. |
| 8,544,036 B2 | 9/2013 | Bollapragada et al. |
| 8,583,484 B1 | 11/2013 | Chalawsky et al. |
| 8,595,046 B1 | 11/2013 | Christian |
| 8,595,071 B2 | 11/2013 | Veach |
| 8,615,436 B2 | 12/2013 | Stukenborg et al. |
| 8,620,745 B2 | 12/2013 | You et al. |
| 8,620,752 B2 | 12/2013 | Feldman et al. |
| 8,635,110 B2 | 1/2014 | Thierer et al. |
| 8,645,205 B2 | 2/2014 | Nag et al. |
| 8,666,796 B2 | 3/2014 | Balseiro et al. |
| 8,666,807 B1 | 3/2014 | Murray et al. |
| 8,666,813 B2 | 3/2014 | Gonen et al. |
| 8,676,619 B2 | 3/2014 | Lotvin et al. |
| 8,676,650 B1 | 3/2014 | Jurca |
| 8,682,720 B1 | 3/2014 | Wills et al. |
| 8,694,349 B2 | 4/2014 | Lean et al. |
| 8,700,471 B2 | 4/2014 | Schupp et al. |
| 8,702,607 B2 | 4/2014 | LeBoeuf et al. |
| 8,706,548 B1 | 4/2014 | Blume et al. |
| 8,719,089 B1 | 5/2014 | Kent |
| 8,719,096 B2 | 5/2014 | Selvaraj et al. |
| 8,739,204 B1 | 5/2014 | Evans et al. |
| 8,751,302 B2 | 6/2014 | Subramanian et al. |
| 8,751,425 B2 | 6/2014 | Bagley et al. |
| 8,756,104 B2 | 6/2014 | Lynn |
| 8,762,199 B2 | 6/2014 | Schwartz et al. |
| 8,768,772 B2 | 7/2014 | Schachter et al. |
| 8,781,875 B2 | 7/2014 | Chatter et al. |
| 8,782,683 B2 | 7/2014 | Balakrishnan et al. |
| 8,788,334 B2 | 7/2014 | Rose et al. |
| 8,788,337 B2 | 7/2014 | LeBlanc et al. |
| 8,788,343 B2 | 7/2014 | Burdick et al. |
| 9,280,785 B1 | 3/2016 | Jain |
| 2002/0012443 A1* | 1/2002 | Rhoads ............ H04N 1/00037 382/100 |
| 2002/0169659 A1 | 11/2002 | Bollapragada et al. |
| 2003/0101449 A1* | 5/2003 | Bentolila ............ G06Q 30/0255 725/10 |
| 2004/0025176 A1* | 2/2004 | Franklin ............ H04N 21/812 725/22 |
| 2004/0210929 A1 | 10/2004 | Bollapragada et al. |
| 2005/0283795 A1* | 12/2005 | Steelberg ............ H04N 7/173 725/32 |
| 2006/0026061 A1 | 2/2006 | Collins |
| 2006/0253323 A1 | 11/2006 | Phan et al. |
| 2007/0156838 A1* | 7/2007 | Kocho ............ G06Q 30/0241 709/217 |
| 2007/0157245 A1 | 7/2007 | Collins |
| 2007/0239533 A1 | 10/2007 | Wojcicki et al. |
| 2008/0004948 A1 | 1/2008 | Flake et al. |
| 2008/0021791 A1 | 1/2008 | Steelberg et al. |
| 2008/0065479 A1 | 3/2008 | Tomlin et al. |
| 2008/0243601 A1 | 10/2008 | Patel et al. |
| 2008/0262917 A1 | 10/2008 | Green et al. |
| 2009/0099904 A1 | 4/2009 | Affeld et al. |
| 2009/0165044 A1 | 6/2009 | Collet et al. |
| 2009/0210287 A1 | 8/2009 | Chickering et al. |
| 2009/0248478 A1 | 10/2009 | Duggal et al. |
| 2010/0017298 A1 | 1/2010 | Stukenborg et al. |
| 2010/0036718 A1 | 2/2010 | Hamilton, II et al. |
| 2010/0082401 A1 | 4/2010 | Vee et al. |
| 2010/0100414 A1 | 4/2010 | Lin et al. |
| 2010/0198694 A1 | 8/2010 | Muthukrishnan |
| 2010/0198695 A1 | 8/2010 | Muthukrishnan et al. |
| 2010/0257054 A1 | 10/2010 | Martin et al. |
| 2010/0318432 A1 | 12/2010 | Zinkevich et al. |
| 2011/0029373 A1 | 2/2011 | Steelberg et al. |
| 2011/0047026 A1 | 2/2011 | Biggs et al. |
| 2011/0112900 A1 | 5/2011 | Sanghavi |
| 2011/0238486 A1 | 9/2011 | Liu et al. |
| 2011/0246312 A1 | 10/2011 | Meek et al. |
| 2011/0314495 A1 | 12/2011 | Zenor |

(56) References Cited

U.S. PATENT DOCUMENTS

| | | |
|---|---|---|
| 2012/0036023 A1 | 2/2012 | Das et al. |
| 2012/0042338 A1* | 2/2012 | Kitts ............... H04N 21/25866 |
| | | 725/35 |
| 2012/0203623 A1 | 8/2012 | Sethi et al. |
| 2012/0215903 A1 | 8/2012 | Fleischman et al. |
| 2012/0303464 A1 | 11/2012 | Gorman et al. |
| 2013/0060628 A1 | 3/2013 | Catrambone |
| 2013/0097629 A1 | 4/2013 | Popescu et al. |
| 2013/0218511 A1 | 8/2013 | Mager et al. |
| 2013/0263181 A1 | 10/2013 | Impollonia et al. |
| 2013/0298147 A1 | 11/2013 | Klein et al. |
| 2013/0325585 A1 | 12/2013 | Amit et al. |
| 2013/0325589 A1 | 12/2013 | Jordan |
| 2014/0058827 A1 | 2/2014 | Svirsky et al. |
| 2014/0109123 A1* | 4/2014 | Balakrishnan ....... H04N 21/252 |
| | | 725/14 |
| 2014/0149232 A1 | 5/2014 | Ringdahl |
| 2014/0297400 A1 | 10/2014 | Sandholm |
| 2014/0310756 A1* | 10/2014 | Canney ............. H04N 21/2221 |
| | | 725/86 |

OTHER PUBLICATIONS

Adany et al., "Personal Advertisement Allocation for Mobile TV", Proceedings of MoMM2009, Dec. 14-16, 2009, Kuala Lumpur, Malaysia.

Bollapragada et al., "NBC's Optimization Systems Increase Revenues and Productivity", Interfaces, INFORMS, vol. 32, No. 1, Jan.-Feb. 2002, pp. 47-60.

Bollapragada et al., "Scheduling Commercials on Broadcast Television", Operations Research, INFORMS, vol. 52, No. 3, May-Jun. 2004, pp. 337-345.

Reddy et al., "SPOT: Scheduling Programs Optimally for Television", Management Science, vol. 44, No. 1, Jan. 1998, pp. 83-102.

Bollapragada et al., "Scheduling Commercial Videotapes in Broadcast Television", Operations Research, INFORMS, vol. 52, No. 5, Sep.-Oct. 2004, pp. 679-689.

Gal-Or et al., "Targeted Advertising Strategies on Television", Management Science, INFORMS, vol. 52, No. 5, May 2006, pp. 713-725.

* cited by examiner

| Name | Advertiser | Agency | Segment | Total $ | Flight | Imp. Goal | CPM |
|---|---|---|---|---|---|---|---|
| Campaign #1 | HOULIHAN LAWRENCE - CLARA FABBRI | Telestory Pictures | HH with Kids 6-11 | $14,548.00 | 01/19/2015 02/15/2015 | 2638010 | $5.57 |
| Campaign #2 | STANNAH STAIRLIFTS | A Professional Edge | A25-45 & HH $75k+ | $86,638.00 | 01/18/2015 02/20/2015 | 1347315 | $15.04 |
| Campaign #3 | THE REAL ESTATE SHOPPE - KATHY WELE | PD: Davis, Jimmy In House | NFL Enthusiasts | $17,095.00 | 01/19/2015 02/21/2015 | 774108 | $9.35 |
| Campaign #4 | Emergency Committee for Israel | SIGNATURE PREMIUM IDEAS | NFL Enthusiasts | $14,495.00 | 01/16/2015 02/17/2015 | 1441111 | $9.35 |
| Campaign #5 | MEDICENTER | Group Matrix | HH with Children 1-4 | $52,001.00 | 01/16/2015 02/01/2015 | 1677123 | $6.99 |

401 — Name
402 — Advertiser
403 — Agency
404 — Segment (Total $)
405 — Flight
406 — Imp. Goal
407 — CPM

FIG. 4

Q1 Buy

| Network Name | Consumed Spots | Total Spots | Expected Imp. | Total Dollars | CPM | % of Rate Card |
|---|---|---|---|---|---|---|
| | | | | Advertiser: PC Richard & Son Agency: Marc USA Flight: 01/12/2015-03/15/2015 Segment: HH with Children 1-4 | | |
| ▲ ESPN | 354 | 493 | 6,056,434 | $42,334.38 | $6.99 | 135.16% |
| ▲ GSN | 357 | 691 | 6,751,542 | $47,193.80 | $6.99 | 244.69% |
| ▲ BIO | 360 | 1,026 | 8,217,300 | $57,443.04 | $6.99 | 319.13% |
| ▲ MTV2 | 360 | 1,147 | 7,259,220 | $50,741.91 | $6.99 | 321.90% |
| ▼ DAM | 360 | 1,478 | 8,016,560 | $56,047.77 | $6.99 | 331.15% |
| Daypart | Consumed Spots | Total Spots | Expected Imp. | Total Dollars | CPM | % of Rate Card |
| ▼ Daytime | 180 | 699 | 3,448,980 | $24,108.39 | $6.99 | 257.67% |
| Week #60 02/16/2015 | 20 | 96 | 383,220 | $2,679.71 | $6.99 | 257.67% |
| Week #61 02/23/2015 | 20 | 96 | 383,220 | $2,679.71 | $6.99 | 257.67% |

Campaign #3

Advertiser: THE REAL ESTATE SHOPPE - KATHY WELE
Agency: PJDJ Davis, Jimmy in House
Flight: 01/19/2015–02/21/2015
Segment: NFL Enthusiasts

| Network Name | Consumed Spots | Total Spots | Expected Imp. | Total Dollars | CPM | % of Rate Card |
|---|---|---|---|---|---|---|
| GALA | 2 | 20 | 768 | $100.00 | $141.34 | 100.00% |
| Daypart | | | | | | % of Rate Card |
| ▸ Late Night | 2 | 20 | 768 | $100.00 | CPM | 100.00% |
| ▸ ID | 1 | 70 | 48,735 | $465.67 | $9.35 | 97.14% |
| Daypart | | | | | | % of Rate Card |
| ▸ Daytime | 1 | 70 | 48,735 | $465.67 | $9.35 | 97.14% |
| Week BBB 01/19/2015 | 1 | 70 | 48,735 | $465.67 | $9.35 | 97.14% |
| ▸ AHC | 3 | 126 | 686,169 | $6,415.68 | $9.35 | 4277.13% |
| ▸ HLN | 1 | 61 | 38,389 | $352.98 | $9.35 | 715.92% |

FIG. 9

AUTOMATED ALLOCATION OF MEDIA CAMPAIGN ASSETS TO TIME AND PROGRAM IN DIGITAL MEDIA DELIVERY SYSTEMS

RELATED APPLICATIONS AND CLAIM OF PRIORITY

This patent document claims priority to, and is a continuation of, U.S. patent application Ser. No. 16/154,139 filed Oct. 8, 2018; which in turn is a continuation of U.S. patent application Ser. No. 15/634,072 (U.S. Pat. No. 10,097,904) filed Jun. 27, 2017; which in turn is a continuation of U.S. patent application Ser. No. 15/000,742 (U.S. Pat. No. 9,699,502) filed Jan. 19, 2016; which in turn claims priority to U.S. provisional patent application No. 62/104,685 filed Jan. 16, 2015. The disclosures of each priority patent application are fully incorporated into this document by reference.

BACKGROUND

This document relates to methods and systems for the allocating, scheduling and delivering campaigns of media assets on media delivery systems, such as broadcast or cable television (TV), radio, and over-the-top (OTT) delivery systems. In one embodiment, this document describes methods and systems for allocating digital video media assets to video programming in TV and/or OTT systems.

Currently in TV broadcast systems and other media delivery services, the decision making processes of advertisement sales systems and traffic systems are separate from each other. Thus, it is often impossible to schedule campaigns that have been sold. If advertisements are sold but not fully allocated, the service provider needs to provide the buyer with makegoods, that is, allocation of future inventory to the buyer for free in order to compensate for the delivery that failed. The process of providing makegoods is a time-consuming, non-revenue-generating activity, and involves a large force of thousands of account executives. Similarly inefficient processes are present in other media areas like radio and digital and in cross-media advertising.

Currently, media service providers do not have optimization to decide which campaign requests should be rejected versus accepted, and what inventory to use to fulfill them. Rather, account executives manually construct campaigns, often making poor decisions when earmarking inventory in the process. Current advertising traffic systems have only heuristic scheduling. This causes makegoods and lost revenue.

SUMMARY

In an embodiment, a system for automatically managing delivery of digital media assets via one or more media delivery services (such as digital video delivery services) includes a first data store containing digital content files, each of which corresponds to a digital media asset, and at least some of which include metadata indicating one or more campaigns with which the digital content file's digital media asset is associated. The system also includes a second data store (which may be integrated with or separate from the first data store) containing an inventory of digital programming files, each of which corresponds to one or more user-selectable media programs (such as videos). The system includes a digital video (or other media) server configured to access the first data store and the second data store and transmit the digital content files and the digital programming files to media presentation devices for audience consumption. The system also includes a campaign manager processor and a non-transitory computer-readable medium containing programming instructions that, when executed, will cause the campaign manager processor to perform an allocation process.

The allocation process may include receiving consumption data corresponding to user-selectable media programs and digital media assets that various audience members consumed in a first campaign. The consumption data may be received directly or indirectly from a set of media presentation devices, or from another source such as a data store. The system also may receive, from a media delivery service that corresponds to the digital media server, an inventory of digital programming files that are available for presentation to the media presentation devices at future times, along with metadata corresponding to the digital programming files in the inventory. The system will receive an allocation value. The allocation value may include an under-allocation value, an over-allocation value, or both an under-allocation value and an over-allocation value. The system will receive, from a campaign requestor, a selection of one or more parameters for a second campaign. The system will then identify a set of digital media assets for the second campaign, and it will also analyze the consumption data and the metadata to identify one or more digital programming files in the inventory to which to allocate at least some the digital media assets for the second campaign. The system will then automatically allocate the digital media assets for the second campaign to the identified digital programming files in the inventory in accordance with the one or more parameters and so that the allocating is consistent with the allocation value. The digital programming files with allocated digital media assets may then be presented to audience members via video or other media presentation devices in the second campaign.

Optionally, the system also may analyze the consumption data and the metadata to identify one or more additional programming files and future times to which to allocate additional digital media assets corresponding to a remainder of the first campaign. If so, the system may automatically select a group of the additional digital media assets and allocate the selected additional digital media assets to the identified additional programming files at future times in accordance with the one or more parameters for presentation by the digital video server to audience members as the remainder of the first campaign.

In some embodiments, the system may analyze the consumption data and the metadata to identify a time at which to assign each of the digital media assets for the second campaign in accordance with the one or more parameters. If so, then when automatically allocating the digital media assets for the second campaign to the identified digital programming files in the inventory, the system may do so such that each of the digital media assets for the second campaign will be presented to audience members at the digital media asset's assigned time.

In some embodiments, when the digital media server presents a media program corresponding to one of the digital programming files in the inventory, it will do so such that the digital media assets that are allocated to the digital programming file are output to an audience member with the first media program via a media presentation device.

Optionally, the digital media delivery service may include a television network or networks, and the user-selectable media programs may include television programs that a user may select by causing a video presentation device to select a channel or on-demand service corresponding to one or more of the television networks. In addition, the consumption data for each of the user-selectable media programs and the digital media assets may include a number of impressions, as well as one or more parameters about audience members who viewed the user-selectable media programs and the digital media assets.

In some embodiments, when identifying the digital programming files in the inventory to which to allocate the digital media assets, and when automatically allocating the digital media assets for the second campaign to the identified digital programming files, the system may simultaneously allocate the inventory to multiple campaigns. It may do so by identifying a number of expected impressions for the second campaign, identifying a number of expected impressions for at least one additional campaign, and using an automated process to automatically identify a set of digital programming files to which the digital media files in the second campaign will be allocated so that the number of digital media files allocated to each of the digital programming files in the set remains within the allocation value. The automated process may include, for example, a greedy algorithm, genetic algorithm, tree search, integer programming, simulated annealing, local search or tabu search.

When the system simultaneously allocates multiple campaigns, in some embodiments it may present at least a subset of the campaigns to a user via a user interface for review. The system may receiving an acceptance or non-acceptance of each of the presented campaigns via the user interface. If so, it may implement only the presented campaigns for which the system received an acceptance.

When the system simultaneously allocates multiple campaigns, in some embodiments it may determine whether any campaign will conflict with the selected one or more parameters, and if so reject that campaign. The system may also determine whether any candidate campaign will be less profitable than a different campaign with which the candidate campaign's identified digital programming files in the inventory could instead be used, and if so it may reject the candidate campaign. In either situation, the system may then un-allocate the digital media assets from the identified digital programming files for any campaign that the campaign manager processor has rejected.

In some embodiments, the parameters for the second campaign may include a smoothness constraint. If so, then when identifying the digital programming files in the inventory to which to allocate the digital media assets, and when automatically allocating the digital media assets for the second campaign to the identified digital programming files in the inventory, the system may identify a number of expected impressions for the second campaign in a scope, wherein the scope is a time interval, or the scope is a combination of a time interval and one or more media delivery services. The system may then allocate the digital media files in the second campaign to the identified digital programming files in accordance with any of multiple options. A first option is that a number of impressions associated with each instance of the scope in the second campaign satisfies a threshold criterion. The threshold criterion is that the instance of the scope be not larger than a first threshold, not smaller than a second threshold, or neither larger than the first threshold nor smaller than the second threshold. A second option is that a number of impressions presented in any instance of the scope during the second campaign is not disproportionately larger than a number of impressions presented in any other instance of the scope during the second campaign. A third option is that a number of spots presented in any instance of the scope during the second campaign is not larger than the first threshold, not smaller than the second threshold, or neither larger than the first threshold nor smaller than the second threshold. A fourth option is that a number of spots presented in any instance of the scope during the second campaign is not disproportionately larger than a number of spots presented in any other instance of the scope during the second campaign.

In some embodiments, the system may receive consumption data for the digital media assets of the second campaign. The system may receive this data directly or indirectly from one or more of the video presentation devices. If so, the system may analyze the received consumption data to determine whether the received consumption data indicates that an expected number of impressions of the digital media assets of the second campaign was achieved. If the expected number of impressions of the digital media assets of the second campaign was not achieved, the system may automatically allocate one or more of the digital media assets to one or more additional digital programming files in the inventory in accordance with the one or more parameters for presentation to audience members via video presentation devices.

In some embodiments, the system may cause a display device to output a heatmap that includes various sectors of the display device. Each sector is represented as a cell, and each cell presents a value that is associated with inventory of a given scope. The system will select a color for each of the cells based on a measure of the value of the inventory associated with that cell, and it will cause the display device to output each of the sectors so that each cell is presented in in the cell's selected color.

In some embodiments, the system may cause a proposal that includes parameters of the second campaign to be presented to the campaign requestor for review. The system may identify a response time within which the campaign requestor must respond to the proposal. If the campaign requestor positively responds to the proposal within the response time, the system will cause the proposal to be presented to a second entity. If the campaign requestor rejects the proposal or does not positively respond to the proposal in the response time, then the system may either un-allocate the digital media assets for the second campaign from the identified digital programming files. In addition, if the campaign requestor so indicates, the system may return the campaign request for an additional optimization process.

In some embodiments, the system may receive, from the campaign requestor, a selection of one or more constraints on attributes of a target audience. The attributes can include, for example, demographic attributes, show attributes, network digital media service attributes, time attributes, behavioral attributes, geographic attributes, and/or social network attributes. If so, the system may use the received parameters and the received constraints on attributes to identify an audience segment. Then, when performing the automatic allocation, the system may do so such that the digital media assets in aggregate will be presented to at least a threshold number of impressions or unique impressions within the audience segment. As an additional option, when the system receives an indication that an audience segment will be a premium target, it may use that indication as an additional parameter in the automatic allocation.

In some embodiments, at least a subset of the digital media assets may include dynamic content with a variable component that can be selected at the time the second campaign is presented to audience members based on one or more dynamic constraints. If so, then when automatically allocating the digital media assets for the second campaign to the identified digital programming files, the system may determine whether the dynamic content of each of the digital media assets that has such content satisfies the selected one or more parameters. It may also identify a dynamic constraint of the identified digital programming files and determine whether the digital media asset's dynamic content satisfies the identified dynamic constraint. It will then only allocate a digital media asset to an identified digital programming file if the digital media asset's dynamic content satisfies the selected one or more parameters and the identified dynamic constraint. Optionally, after allocating to the second campaign any of the digital media assets having dynamic content that satisfies the selected one or more parameters and the identified dynamic constraint, the system may update (i.e., re-perform) the automatic allocation for any remaining inventory to ensure that the second campaign is still consistent with the allocation value and satisfies the one or more parameters.

BRIEF DESCRIPTION OF THE DRAWINGS

FIG. 4 illustrates an example of a list of campaign requests according to an embodiment.

FIG. 7 illustrates detailed information about an optimized quote according to an embodiment.

FIG. 8 illustrates an example of a list of optimized campaign requests and general information about the status of each request according to an embodiment.

FIG. 9 illustrates detailed information about optimized campaigns at different levels of granularity (network, daypart, and week) according to an embodiment.

DETAILED DESCRIPTION

Figure 1:
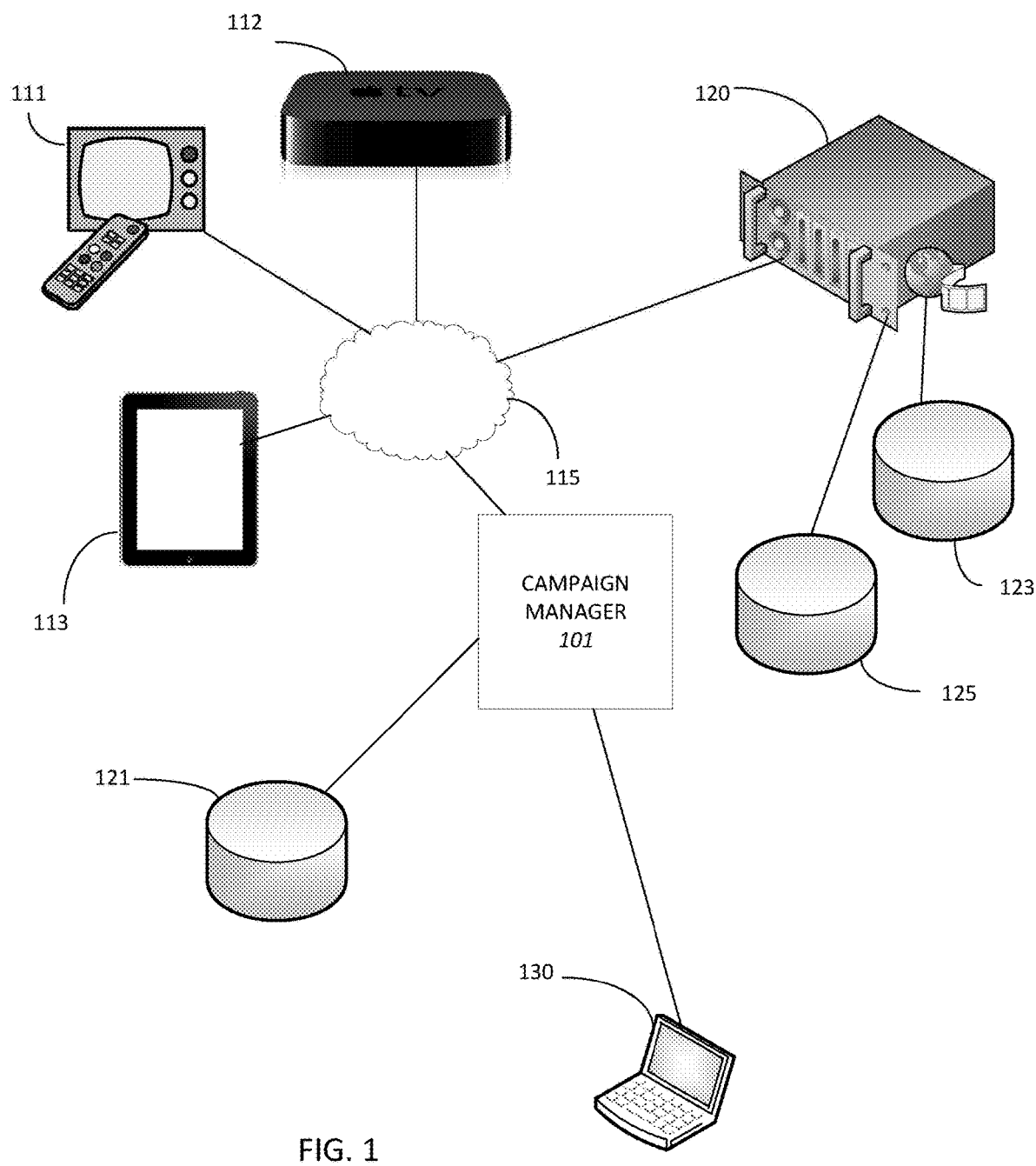
FIG. 1 is a block diagram of certain elements of a system that may be used to manage the allocation of media assets to one or more media delivery services.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used in this document, the term "media delivery service" refers to any service that includes transmission hardware to deliver video or audio programming to an audience in live or pre-recorded format. Examples include television (i.e. videos) delivered via any format, including but not limited to over-the-air broadcast television transmission systems, cable television head end delivery systems, OTT streaming television channels or streaming video services that are available via the Internet, digital video recorders (DVRs), cloud-based DVRs, and other Internet video; radio transmission systems; and systems for delivering audio or video files over a digital communications network such as systems for webcasting, datacasting, Internet video streaming, Internet radio, podcasting and the like. This document may use the terms "video media delivery service" or "digital video delivery service" to refer to a system that delivers video programming, such as the options described above (e.g., broadcast TV, cable TV and/or OTT services).

As used in this document, document the term "digital programming file" refers to a digital file containing one or more units of audio and/or visual media that a consumer may select for viewing via a media delivery service. Examples include files containing broadcast or cable television programs (which a consumer may select by selecting the channel on which the program is broadcast), files containing on-demand video or audio programs, podcasts, pay-per-view programs, and the like. A consumer "consumes" the files by listening to and/or viewing the media content that the digital programming file contains.

As used in this document, a "media asset" is a unit of non-user-selected media that will be presented to consumers of a media delivery service (i.e., viewers and/or listeners) in association with a consumer-selected program. A media asset will be stored in a non-transitory memory in the form of one or more digital media files. When the media delivery service is a broadcast, cable, or on-demand audio or video program delivery service, examples of media assets video or audio files that contain a recorded commercial, public service announcement, or other programming for which the service may receive payment from the media asset sponsor. In the context of a digital communications network, a media asset may be a particular page or part of a page of a website or other digital media asset.

As used in this document, a "temporal parameter" refers to a measurement or value of a time associated with a media asset distributed by a media delivery service. Examples of temporal parameters include a scheduled start time, a scheduled end time, a day part, a program run time, a time within a program or advertising pod, such as a scheduled commercial break time, a position within a commercial break time, a frame count within a program, a position before or after an event in a program, and the like.

As used in this document, a "campaign" is a set of media assets that share a common idea or theme, or which come from a common buyer. Commonly, although not necessarily, a campaign may be a set of media assets that contain commercials or other advertisements. A campaign can be as specific as a collection of specific units, or it can be a collection of criteria for the association of media assets that satisfy the criteria. The media delivery service will the campaign to consumers along with the media delivery service's other media assets. A campaign may be presented on a single media service (such as a television network) or multiple media delivery services (such as television, cable, streaming media, and/or web pages).

As used in this document, the term "media presentation device" means a hardware item or system containing a processing device and one or more additional hardware components for presenting the audio and/or visual content of a digital programming file to a consumer. The hardware components may include, for example, a display device, an audio speaker, a headphone port, and/or a transmitter containing near field communication hardware (such as Bluetooth hardware) configured to transmit the audio and/or visual content to a proximate display device and/or audio speaker. A "video presentation device" is a device having a display and hardware configured to present the content of streaming video, broadcast or cable video, or digital video files to users, such as televisions, computing devices (e.g., desktop computers, laptop computers, tablets, smartphones), video gaming systems, and wearable devices having electronic displays such as smartwatches and smart eyewear.

FIG. 1 illustrates a system that may be used to manage the delivery of a campaign in in a media delivery service. The system may include a campaign manager 101, which is a set of one or more processing devices and one or more software programming modules that the processing device(s) execute to perform the functions of this description. Multiple media presentation devices such as smart televisions 111, set top boxes 112 and/or computing devices 113 are in direct or indirect communication with the campaign manager 101 via one or more communication networks 115. The media presentation devices receive and present programming from media assets to users via a display device, an audio speaker, or both. The media presentation devices also include hardware that tracks viewers' viewing activity at periodic time intervals, such as intervals of one minute or less, to identify consumption statistics such as the times at which a consumer is consuming a program and associated media assets, as well as the, program and/or channels that the consumer consumes (e.g., views). The system can later use this data to determine consumption statistics for each media asset, such as a total number of impressions, a rate of impression over time, a number of impressions during a particular program or time period, and the like.

Any number of media delivery services may contain one or more media servers 120 that transmit audio and/or video programming files to the media presentation devices via the network 115. The programming files, which may be stored in one or more programming storage facilities 123, may include standard programming along with media assets that are part of a campaign, such as advertisements or sponsored program segments. The media servers 120 may transmit the programming files in a streaming format, so that the media presentation devices present the content of the programming files as the programming files are streamed by the media server 120. The campaign manager also may have access to a data store of available media assets 125 that are used in various campaigns. The media presentation devices also may include hardware that tracks viewers' viewing activity at periodic time intervals, such as intervals of one minute or less, to identify consumption statistics such as those described above.

Optionally, the system may also include a traffic server 150 that serves as an intermediary between the media server 130 and other components of the system. The traffic server 150, when available, will receive scheduling data and generate the commands that cause the media server to present the content of programming files to consumers at scheduled times. An optional business intelligence server (not shown in FIG. 1) may sit between the traffic server and media presentation devices, or at another appropriate part of the system, to measure consumption data of programming files and media assets.

The campaign manager 101 will store the data captured about what programs and media assets viewers consumed in a data storage facility 121. The system may then use this data in various analytical tasks that will be described below. The campaign manager 101 may compute and store up-to-date aggregate statistics on this data as well. For example, how many households or devices in each population segment (such as NFL enthusiasts, viewers in the market for a car, or households with kids in a certain age range) watched a particular show or network in a given time period.

The campaign manager may automatically store and update data representing the available media assets and programming files that are presented to viewers across multiple media presentation services and broadcast weeks, and—via the historical viewing data capturing what people watched—forecast demographic information about the audience for each media asset. Optionally, at least some of the forecasting may happen before the media assets are assigned to campaigns. For example, the campaign manager may take historical averages (within a certain time window of the past, e.g., 3 months) of how many households or devices in a certain segment watched a certain network or show at a certain time window, and that gives the projected impressions for that time in that segment in that network or show. Seasonality can be handled, in a simple example, by only averaging historical data within the season. On a more sophisticated end, the campaign manager may use machine learning to generalize across the training examples and/or across seasons.

By tracking people's viewing data, the system can track the delivered number of impressions to each committed campaign, can deliver analytical data to both the seller and the buyer of the campaign, and it can use the analytical data in the allocation of additional media assets in the campaign to future delivery slots in one or more media delivery systems. A delivery slot may be include a temporal parameter that comprises (i) a "spot," which is a particular day and time; or (ii) a daypart, meaning a time range within a given day during which the media asset may be presented. A delivery slot also may include a media delivery system identifier, which can include a particular television network, cable channel, over-the-top service, or other media delivery service. The identifier may be a single service identifier, or an identifier of a group of services to which the media asset may be allocated.

To allocate media assets of a campaign to one or more programming files, the campaign manager 101 may generate a scheduling file containing data representing: (i) the media assets to be presented; and (ii) a delivery slot (temporal parameter and media delivery system identifier). The campaign manager may send the scheduling file to the media server 120, which will select the media asset from its data store 125 and present the media asset to consumers in accordance with the instructions for the delivery slot.

The system also may include one or more computing devices 130 containing a processor, computer-readable memory with programming instructions, and a user interface (such as a keyboard, touch screen, or other input devices) via which a user who is requesting a campaign (such as an advertising buyer or seller) may enter parameters for a campaign. The computing devices 130 may transmit this information to the campaign manager 101 via one a direct connection or one or more communication networks.

Figure 2:
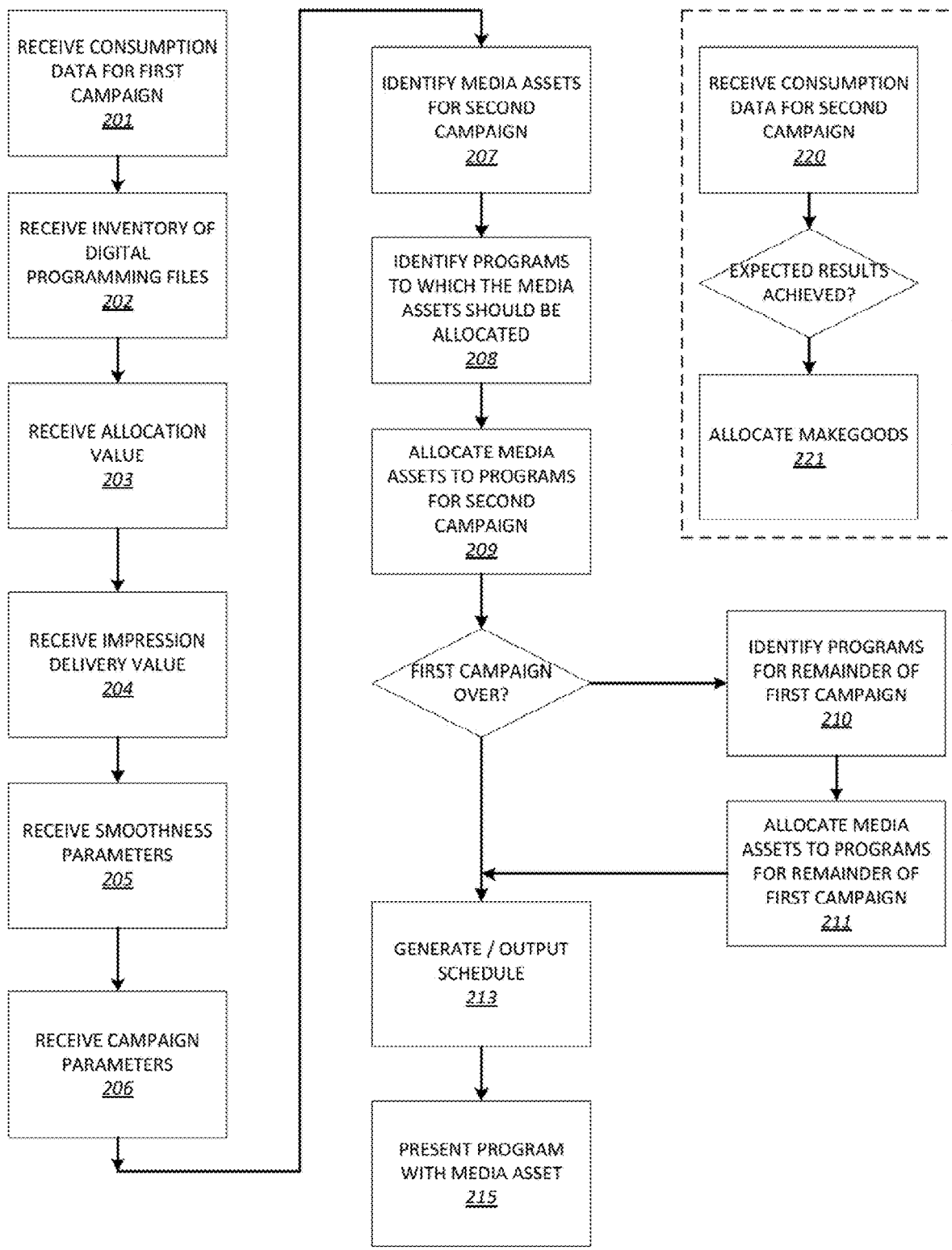
FIG. 2 is a flow diagram illustrating a process of allocating digital media assets to programs in one or more media delivery services.

FIG. 2 is a flowchart describing a digital media asset allocation process. As described above, the system that implements the process will include a first data store containing a digital content files. Each digital content file corresponds to a digital media asset (such as a video or audio advertisement). At least some of the files will include metadata indicating one or more campaigns with which the digital content file's digital media asset is associated. A second data store contains of digital programming files, each of which corresponds to one or more user-selectable media programs (e.g., television programs, podcasts, and the like).

A digital media server is configured to access the first data store and the second data store and transmit the digital content files and the digital programming to available media presentation devices. The system also includes a campaign manager in which a processor executes programming instructions that cause the campaign manager processor to receive consumption data 201 for a first campaign. The consumption data indicates the user-selectable media programs and digital media assets that audience members consumed in the first campaign. The system may retrieve the consumption data from a memory, or receive the consumption data from a group of media presentation devices that presented the programs to audience members, and/or from one or more programming servers that sent the programs to the media presentation devices.

By way of example, if the media delivery system includes one or more television networks, the user-selectable media programs may television programs that a user may select by causing a media presentation device to select a channel or on-demand service corresponding to one or more of the television networks. The consumption data for each of the user-selectable media programs and the digital media assets may include a number of impressions, as well as demographic information about audience members who consumed the user-selectable media programs and the digital media assets.

The system will also receive, from a media delivery service that corresponds to the digital media server, an inventory of digital programming files, along with metadata corresponding to the digital programming files in the inventory that will be available for presentation to the media presentation devices at future times 202.

The system may then receive one or more parameters for a second campaign. For example, the system may receive an allocation value 203, which represents an under-allocation value, an over-allocation value, or both an under-allocation value and an over-allocation value (i.e., a range around, or maximum deviation from, an expected value). The allocation value indicates the extent to which a media program or group of media programs may have digital media assets (e.g., advertisements) allocated to it in a number that exceeds, or is less than, an expected number. Optionally, the system may also receive an impression delivery value 204 that represents a maximum amount by which an actual number of impressions delivered may deviate from an expected number of impressions delivered. The system also may receive one or more smoothness constraints 205, which will help ensure that digital media assets are not unduly clustered together (or spaced too far apart) when allocated to programs as described below. A smoothness constraint is a criterion that the system will use to assess the smoothness of a number of impressions received over a time period, a number of spots presented over a time period, or another time-based measure. The allocation value, impression delivery value and smoothness parameter(s) may be retrieved from a memory, received from a user input, defined or set as a default value, or otherwise received.

The campaign manager may also receive, from a campaign requestor, a selection of one or more additional parameters for a second campaign 206. The campaign requestor may be an entity that is purchasing spots in which digital media assets may be inclusion in a campaign, a seller representative who seeks to have the system allocate spots or generate a report of what a campaign may comprise if sold to a buyer, a memory device or a system that contains the parameters, or another entity or system that provides the parameters to the campaign manager. The parameters may include, for example, an expected number of impressions, demographic data of the desired audience members in the campaign, any of the parameters described above (e.g., smoothness, under- and over-allocation values, etc.), or other parameters.

The campaign manager may then identify a set of digital media assets for second campaign 207, analyze the consumption data and the metadata to identify one or more digital programming files in the inventory to which to allocate a group of the digital media assets for the second campaign 208, and automatically allocate 209 the digital media assets for the second campaign to the identified digital programming files in the inventory in accordance with the one or more parameters for presentation to audience members via media presentation devices in the second campaign so that the allocation satisfies the allocation value (i.e., it does not exceed an maximum (over-allocation value) or go under a minimum (allocation value). Allocation may include generating a set of commands that are configured to cause the digital media server to present each allocated digital media asset during a media program that corresponds to the identified digital programming file. Once digital media assets are allocated to media programs, the digital media server may then present 215 the media programs with the digital media assets to one or more media presentation devices for consumption by audience members.

Optionally, if the first campaign is not yet complete, the system also may analyze the consumption data and the metadata to identify one or more additional programming files and future times to which to allocate additional digital media assets corresponding to a remainder of the first campaign 210. If so, it may automatically select a group of the additional digital media assets and allocate the selected additional digital media assets to the identified additional programming files 211 at future times in accordance with the one or more parameters for presentation to audience members as the remainder of the first campaign.

If the system received an impression delivery value, then when performing the allocation the system may do so in a manner that ensures that the number of impressions delivered in the second campaign will be presented will not deviate from the expected number of impressions delivered by more than the impression delivery value.

If the system received a smoothness constraint, then when allocating it may identify a number of expected impressions for the second campaign during a time interval, and then allocate the digital media files in the second campaign to the identified one or more digital programming files so that the number of impressions associated with each instance of the time interval during the second campaign remains within a determined range of the number of expected impressions. The system may perform the identification by receiving the expected impression values from a user via a user interface, by retrieving them from a memory device, or by determining it using any suitable algorithm based on parameters such as the smoothness criterion. A smoothness criterion also may require that the system allocate no more than a maximum number of spots to a certain network or program in a given time period (such as daypart), no less than a minimum number of spots to the certain network or program in a given time period, or both. More generally, the system's smoothness constraints can be expressed as specifying a minimum and/or a maximum for a given scope, and the minimum and maximum can be defined in terms of the number of spots or in terms of the number of impressions (in a given segment or overall). A scope will be a time interval, which could be a specific time, a daypart, a timespan of one or more programs, or a timespan of a campaign. Alternatively, a scope can be a time interval in a combination with one or more digital media service (e.g., a time interval plus a particular network or group of networks). In this way, the smoothness constraint helps ensure that the presentation of spots over a particular time, or on one or more particular networks over a particular time, is smooth.

In some embodiments, the campaign manager processor may analyze the consumption data and the metadata to identify a time at which to assign each of digital media assets for the second campaign in accordance with the one or more parameters. If so, then when automatically allocating digital media assets for the second campaign to the identified digital programming files in the inventory, the system may do so that and ensure that each of the digital media assets for the second campaign will be presented to audience members at the digital media asset's assigned time. An "assigned time" may be a clock time (i.e., that as measured by a clock in accordance with an applicable time zone), or it may be a measurement of relative time, such as an amount of time after the start of the program, or a percentage of total time in a program (and a spot in the program that corresponds to that value added on after the start, or it may be a range of times within which the digital media asset may be presented, such as a daypart, a relative amount of a total commercial break, and the like.

Optionally, the system may perform a batch optimization process in which it allocates digital media assets for multiple campaigns at the same time. If so, then recall that above the system considered a first campaign and a second campaign. In a batch optimization process, the system may also identify a number of expected impressions for at least one additional campaign, and then when identifying the set of digital programming files to which the digital media files in the second campaign will be allocated, it may do so such that the number of digital media files allocated to each of the digital programming files in the set remains within the allocation value.

If the system allocates digital media assets to multiple campaigns, it may present at least a subset of the multiple campaigns to a user via a user interface for review. The user interface will include a prompt that enables the user to express acceptance or non-acceptance of each campaign. If the system receives a user acceptance of a campaign, the system will cause the campaign to be implemented. A non-acceptance may be a rejection or a request for modification or re-allocation. If the system receives a rejection of the campaign, the system will release the digital programming files back to the inventory for use in other campaigns. If the system receives a request for modification or re-allocation, the system may re-perform the allocation process with one or more different parameters that the system receives from the user via the user interface. Optionally, the system may only implement a campaign after receiving an expression of acceptance from the user.

In addition, in some embodiments the system may decide to reject some of the campaign requests, in which case it will not allocate inventory to them. For example, the system may determine whether any campaign will conflict with the received parameters of the campaign (e.g., constraints, or constraints on attributes) and if so it may reject that campaign. The system also may determine whether any candidate campaign will be less profitable than a different campaign with which the candidate campaign's identified digital programming files in the inventory could instead be used. The system may perform its profitability analysis by subtracting the cost of a campaign (which could be zero, or which could be an actual cost considering the cost of production, transmission, overhead, etc.) from the revenue that the media delivery service will receive from the campaign. The system may then un-allocate the digital media assets from the identified digital programming files (which may involve retracting the allocation, or which may involve not completing the allocation) for any campaign that the system has rejected so that the inventory can be used with a different campaign.

Additional optimization methods may include those described in U.S. Patent Application Publication No. 2014/0297400, published Oct. 2, 2014, and titled "Method and System for Media Advertising Campaign Sales and Allocation," the disclosure of which is fully incorporated into this document by reference.

Optionally, the system may also receive consumption data for the digital media assets of the second campaign from one or more of the media presentation devices 220. The system may receive this information directly from the devices, from a memory, or from one or more intermediary devices or systems. The system will analyze the received consumption data to determine whether the received consumption data indicates that an expected number of impressions of the digital media assets of the second campaign were achieved. If the expected number of impressions of the digital media assets of the second campaign were not achieved, the system may automatically allocate one or more of the digital media assets to one or more additional digital programming files in the inventory in accordance with the one or more parameters for presentation to audience members via media presentation devices in a third campaign 221.

Figure 3:
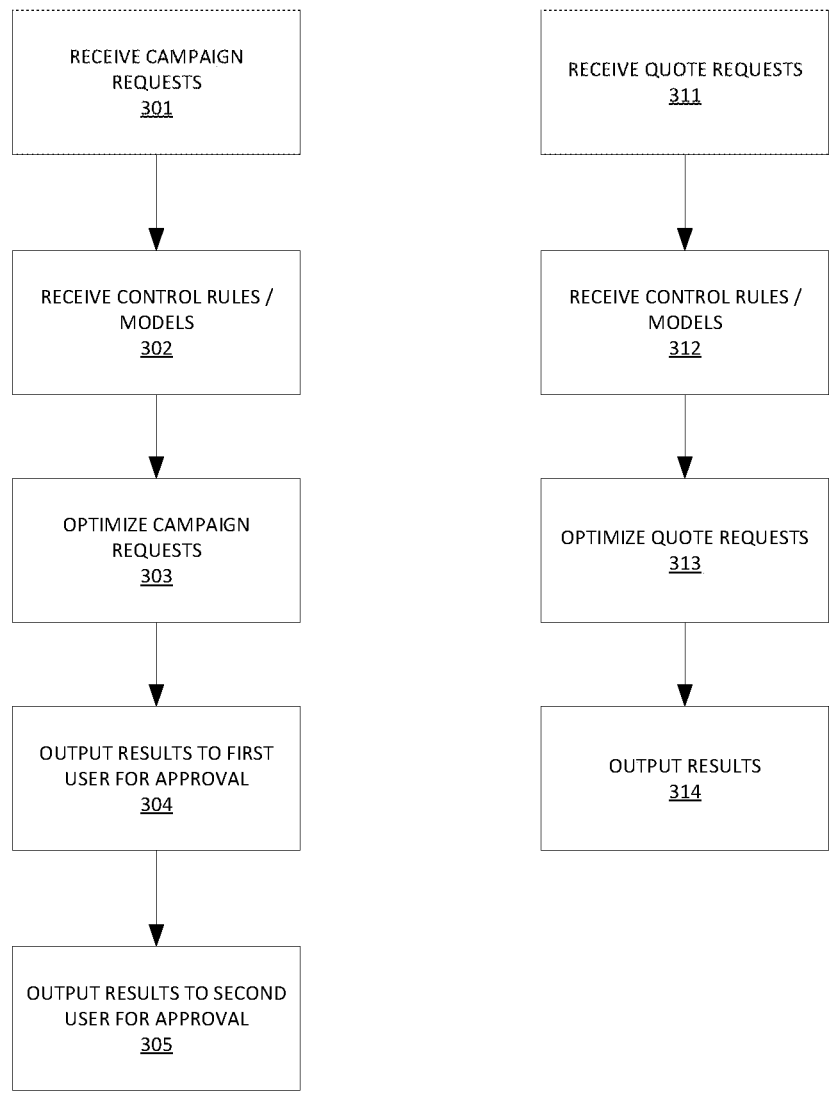
FIG. 3 illustrates examples of optimizing campaign requests and quote requests according to various embodiments.

The automated allocation of campaign assets is now further explained. With reference to FIG. 3, the system may receive one or more campaign requests 301. Additionally, the system may receive additional control rules and/or models for optimization 302. Then, the system may optimize the campaign requests 303 and output the results to the user (i.e., the buyer or seller of the campaign) for approval 304. Once the user approves the optimized campaign requests, the system may output the results to the other entity (e.g., the buyer if the user is a seller) for approval 305. Once the buyer (or other user approves the optimized campaign request, the allocation is complete. If the buyer (or other user) rejects the optimized request, the buyer (or other user) may re-send a new campaign request. In one embodiment, the system may also allow a user to submit a quote request before sending formal campaign requests. The system may receive a quote request 311 from a user and additional control rules or models 312, if applicable, and optimize the quote request 313 and output the result to the user 314. The optimized quote request may give the user a feel for the behavior of the system and formulate a subsequent campaign request that includes reasonable constraints or realistic bids.

Campaign/quote request: The system may allow a user (e.g., a buyer or a seller acting on behalf of a buyer) to define a campaign request or quote request. A campaign request may provide information about the buyer's preferences and constraints to the seller, for example, to allow the seller to allocate inventory to the buyer at a certain price. A quote request may allow a buyer to query the system to get an estimate on how much budget would be required to achieve a certain impression goal, or how many impressions are deliverable given a certain budget. For example, with reference to FIG. 4, both campaign requests and quote requests can include high-level information like a human-readable description and information about the advertiser 401 and agency 402 associated with the quote. Requests may express a start date and end date (hereafter referred to as the campaign's flight 405), possibly with a start time and end time as well. Requests may also target a specific audience demographic segment 403. The system may determine whether a request is for a campaign or a quote by the presence of both a budget 404 and desired number of impressions 406 (in the case of a campaign request) or the absence of one but not both of those data points (in the case of a campaign request).

Campaign Optimization:

After receiving a campaign request, the system may perform an optimization process that will allocate inventory (i.e., spots in programming to which digital media assets may be assigned) from the set of available inventory to the campaign (possibly subtracting out inventory used by previously accepted campaigns, and obeying any additional business rules provided by the seller). In one embodiment, the system may choose to optimize individual campaigns separately, where only one campaign is considered at a time, assuming all other campaigns do not exist. In another embodiment, the system may bundle quote requests into a batch optimization, and optimizes both the existing campaign requests and quotes together. In doing so, the system may allow multiple campaign requests (from the same buyer or different buyers) to build up, and then be optimized in a batch. In this batch optimization, campaigns may compete against each other for available inventory; even campaigns that prefer different segments may compete for the same inventory because spots have audiences that may belong in part to multiple segments.

The batch optimization, by simultaneously determining the allocation of available inventory to all campaigns, may increase or maximize a performance metric associated with the allocation that can either be the overall revenue, or the overall surplus revenue, which is defined by the total revenue minus the value of all allocated spots at a base price (such as the spot rate). The system will respect expressed preferences and constraints from both the buyer and the seller side, such as (1) the number of spots allocated to all campaigns in a network-daypart-week cannot exceed the available number of spots for that combination; (2) the number of spots allocated in a network-daypart-week to any particular campaign cannot exceed a maximum allowance; (3) the total charge of all spots allocated to each campaign cannot exceed the budget of that campaign; (4) the total number of planned impressions for each campaign must be exactly the requested goal impressions (or within a band around the goal impressions if the seller allows for over- and/or under-allocation); (5) if a campaign lasts for more than one period (e.g., week), a smoothness constraint that ensures that the planned number of impressions in each period (e.g., week) must fall between a minimum and a maximum fraction of the goal impressions. The optimization can be solved with various existing or later developed algorithms such as the greedy algorithm, genetic algorithm, tree search or integer programming, simulated annealing, local search, or tabu search and so on.

Alternatively and/or additionally, the system may employ other constraints. As a non-limiting example, several constraints are listed below.

Various forms of targeting by network orders and audience orders.

Whenever an interconnect network order is given a spot, it must get a spot at the same exact time in all zones of the interconnect.

Whenever an interconnect audience order is satisfied, it must get at least the number of impressions that it requested for each of the zones of the interconnect.

Marketing orders must be satisfied despite contributing zero revenue.

Separation A: advertisers from the same product category or industry cannot be allocated to the same break.

Separation B: the same advertiser cannot be allocated to the same break multiple times.

Separation C: the same advertisement (or any one from a set of advertisements) cannot be allocated to the same break multiple times.

Separation A': advertisers from the same product category or industry cannot be allocated to the same break back to back.

Separation B': the same advertiser cannot be allocated to the same break back to back.

Separation C': the same advertisement (or any one from a set of advertisements) cannot be allocated to the same break back to back.

Separation constraints can also be defined in terms of how much time has to pass between two ads from the same advertiser, the same product category or industry, or between two showings of the same ad.

Super-zone orders: some orders want a single network in multiple zones.

Super-network/orbit orders: some orders want multiple networks in a single zone.

Each order has to be fully satisfied to obtain any revenue from it.

As defined above, the batch optimization might sell some spots below the rate card price (also known as spot rate) because that may enable a highly profitable campaign to be constructed. This is because in these combinatorial markets, the side constraints tie the different spots together, so one cannot simply remove from the campaign a spot whose cost per mille (CPM) price is below the rate card price for the segment that the campaign targets. This can be undesirable for many reasons, for example, because the downstream execution systems (traffic systems) typically do not understand package execution but rather execution of individual spots. Therefore, alternatively and/or additionally, the system may adjust the prices of the spots in a campaign so that some spots essentially "subsidize" other spots so that each spot's price exceeds (or at least matches) the spot rate. Sometimes such subsidization is undesirable—e.g., because then it may not be clear how to fix execution failures of certain spots. To avoid this, in one embodiment, the system includes the constraints in the optimization that each spot sells (without subsidy) at the higher of its CPM price and its spot price.

The optimization may vary in the level of granularity. For example, the output can be a detailed schedule down to the spot level, or it can be a higher-level allocation specification, such as allocation at the level of avails or at the pods, that is, how many units (e.g., spots in the case of linear TV) are allocated to each avail or pod, respectively. An avail is a (network, daypart, week)-combination, but coarser units to allocate into can also be used, e.g., networks, dayparts, or weeks, or combinations of two of them.

Alternatively and/or additionally, the system may allow multiple sales forces to sell into the same inventory at different levels of granularity, e.g., interconnect-level sales and zone-level sales, as well as multiple national and local sales. The optimizer (i.e., one or more hardware and software components that perform the optimization process) may decide dynamically what inventory gets allocated to interconnect-level campaigns and which slots to zone-level campaigns in a way that maximizes profit. Similarly, the system may dynamically decide what inventory gets allocated for national versus local. This can also support third-party remnant sellers.

In some embodiments, the system may develop campaigns to permit flexible scheduling of advertisement/media asset assignments. For example, when developing a campaign, the system may preliminarily assign any or all of the advertisements of a campaign to particular positions (i.e., to particular media assets, or to particular temporal positions associated with one or more media assets) in the campaign. However, the system may not present all of the assignments to the first buyer as commitments to schedule an ad a particular position. Instead, at least some of these preliminary assignments may be treated and presented as unscheduled commitments that will be assigned or confirmed at a later time. An unscheduled commitment is one in which the buyer is not guaranteed that a particular ad will be allocated to a particular position or scheduled at a particular time, but instead the seller retains flexibility to allocate, reallocate or reassign the ad in the future. This may happen if, for example, multiple media assets have attributes that will meet the buyer's criteria. If so, then the system can assign advertisements to media assets or temporal positions after it has more information to determine which assignments will maximize a revenue opportunity for the media service provider, such as after it receives other campaign requests from other buyers, or refined supply and/or demand projections. As an example, if a campaign request from another buyer includes a higher bid for the placement of an ad in a particular slot, the system may remap the first campaign to move an ad from its temporary position (e.g., the particular slot) and into another position that satisfies the first campaign's buyer criteria so that the higher-bidding buyer can be awarded the particular slot. When doing remapping, the system also may re-optimize the first campaign to determine which new position, media asset association, or other configuration of the ad in the campaign will maximize the revenue opportunity for the media service provider.

Remapping can be motivated and triggered by any event, such as a new campaign request arriving or supply or demand projections changing, or even a certain time passing with nothing unplanned happening.

In remapping the system may reoptimize what ad inventory gets allocated to what campaigns. Scheduling decisions can be included among those allocation decisions, but don't have to be. The decision variables can be at abstract levels (e.g., do we allocate basketball or golf programming to a particular campaign) or fully concrete (e.g., what exact slots are allocated to what campaigns).

In this reoptimization, the system could take any or all of the following considerations into account if available: execution state of existing campaigns; campaign commitments made so far (which can be abstract so as to retain flexibility to remap); those preferences that are still valid in accepted campaigns; new campaign requests; projected supply; or projected demand.

Furthermore, in this process of leaving commitments intentionally abstract to be able to remap the inventory to accepted campaigns better to make profitable room for additional campaign requests, it does not have to be the scheduling aspects that are left uncommitted. Any aspects of a planned campaign can be declared to the buyer as commitments or left open so as to retain flexibility. For example, the optimizer may have in its plan that specific quantities of specific shows are going to be used to satisfy a campaign, but the buyer is only told some more high-level characterization of that set. For instance, instead of committing to the buyer that the specific planned baseball games will be allocated the buyer, the seller can commit to delivering "premium golf, premium basketball, or any yachting shows" to fulfill the campaign.

The system can be used to reoptimize the allocation in light of new campaign requests, changes in supply (and/or supply projections), and changes in demand projections (represented in the system, for example, via updated reserve prices or reserve campaigns).

Reoptimization may be essentially the same as the optimization described above, except that the campaigns have execution state, which affects what is the best way to fill them with what inventory going forward. For example, a campaign can have an amount delivered so far, which affects how much is still needed to satisfy the campaign commitment. Similarly, the campaign may have executed at a certain volume of advertisements per day so far, which affects how much per day is required and profitable to give to that campaign to satisfy the smoothness constraint that ties the past execution to the future execution.

As in the optimization, reoptimization may take the preferences into account from not only the new campaign requests but also from the previously accepted campaigns. In some embodiments some of those preferences may long be valid, such as some bonus offers that did not get accepted when the campaign was first accepted may no longer be considered to be on offer from the buyer. In the reoptimization, some existing campaigns may get remapped onto the inventory differently than they were mapped before.

Reoptimization can be initiated automatically (e.g., periodically or when supply and/or demand and/or execution state and/or campaign requests have changed sufficiently from projections or from a previous state) or manually.

Input and control to optimization: The system may allow various inputs and campaign controls, whether buyer or seller provided or built-in in the system, in the optimization process. For example, the buyer can select which seller-defined audience segment or segments the buyer wants to target, that is, which impressions count toward that buyer's campaign. As another example, the system may provide attribute targeting that, instead of seller predefining a buyable segment, allows a buyer (or agency or seller's account executive working on the buyer's behalf) to specify substitutes of what various specific inventory pieces could be used to satisfy his campaign request. In one embodiment, this is done by selecting allowable values for some of the attributes, and only impressions that have a value among those allowable values for all those attributes are counted toward the campaign. In one embodiment, the substitutes do not have to be perfect; some inventory can be more valuable than other inventory to that buyer. For example, the system may provide premium targeting, where the bidder is willing to pay more for a certain subsegments of the hard targeting segment. If so, the system may enable a user to identify additional constraints on attributes of the target audience (e.g., the audience must include a certain number or percentage of females having an income above a threshold level). The system may consider these constraints on attributes, and it may give preference to the constraints on attributes when performing the optimization. These constraints on attributes are then fed to the allocation optimizer, whose output can thus be different simply because profit-maximization in this new setting may lead to a different allocation.

In some embodiments, the parameters associated with a particular audience segment may be saved to memory as a template file. In this way, a user can select an audience segment by template instead of having to define it from scratch using constraints or attributes every time.

The system may also allow substitution information to become from the sell-side. For example, the system may receive from a seller a model as to what inventory segments are (possibly imperfect in terms of value) substitutes (overall or for certain subpopulations of buyers, or to a specific buyer). The system can use this information to broaden the buyer's campaign request so a larger set of campaigns could be used to satisfy the request. Furthermore, the optimization may use value-based imperfect-substitution information to specifically determine how much of the substituted-in inventory needs to be used.

Figure 5:
FIG. 5 illustrates an example of user interface for buyer selecting smoothness of a campaign according to an embodiment.

In one aspect of campaign control, the system may allow a buyer to specify in the campaign request other control models or rules, such as various forms of smoothness, frequency, timing, exclusivity, and pod placement constraints and preferences. For example, with reference to FIG. 5, a user may use a user interface to specify a smoothness criterion 501 which is a value or a range of values (e.g., between 80% and 100%) that will to ensure that the planned number of impressions in a flight duration fall between the minimum and a maximum percentages of the goal impressions, or percentage or number of spot impressions over a time period or a program. Smoothness helps to ensure that all (or a disproportionately large number of) the impressions or spots do not occur in a small time window of a campaign.

In one aspect of campaign control, the system may also allow a seller to specify smoothness preferences, which only allows allocation of inventory to campaign requests if that allocation spreads the inventory out across different time periods or within particular programs in a seller-defined "smooth" way. For example, for campaign requests with flight durations between 3 and 10 weeks, the seller may constrain feasible allocations to only those that allocate per week to that campaign at least 5% and at most 40% of the total number of impressions won by a campaign.

In one embodiment, the smoothness desideratum can be hard or soft in the system. A smoothness control is called hard if it must be obeyed. If the smoothness is expressed as a preference (possibly associated with a price at the CPM level or an overall price that a buyer is willing to pay if that preference is honored) that the system can override in favor of other rules or criteria having a higher priority, then it is called soft. Smoothness can also be expressed at different time scales or turned on and off based on, for example, seasonality (e.g., allow a larger number of spots to be sold in the weeks leading up to Christmas) or one-off events (e.g., allow many spots to be sold near the Super Bowl). In another example, the smoothness preference may specify paying more for spots that are for times within two weeks before Valentines, or run week on—week off throughout the campaign flight. In one embodiment, smoothness can be expressed as a hard or soft constraint across other dimensions than time, such as across networks, dayparts, demographics, media types, etc.

Figure 6:
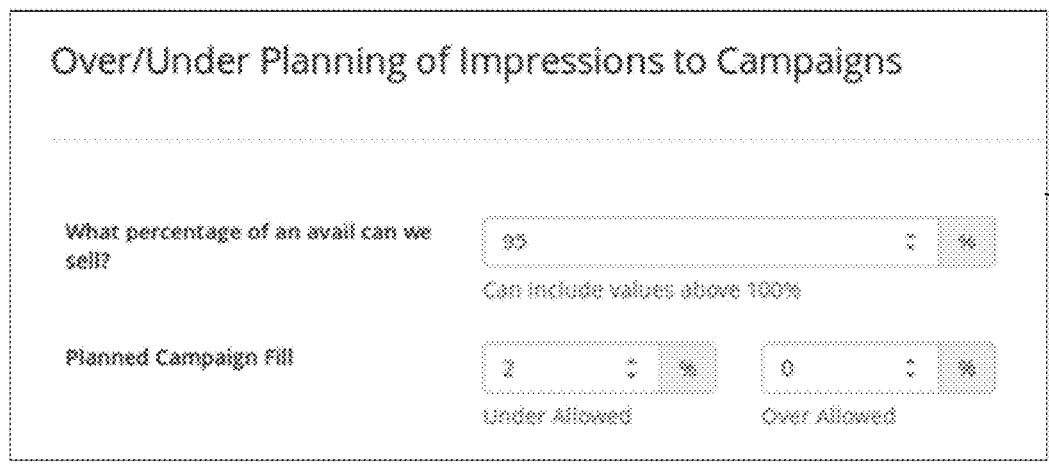
FIG. 6 illustrates an example of user interface for seller selecting under-sell or over-sell of a campaign according to an embodiment, as well as specifying what fraction of the inventory that exists (e.g., in any daypart) can be sold.

In one aspect of campaign control, because inventory forecasts are estimates and not reality, the system may provide to the seller the ability to under- or over-sell its inventory at a variety of levels (e.g., per-avail, overall), such as the user interface 601 shown in FIG. 6, which allows the seller to specify what percentage of the inventory (e.g., in any avail) can be sold. This percentage can be less than, equal to, or more than 100%. The system may use this under- or over-selling as a hedge against future uncertainty in audience composition or size. Allowing oversell may have the effect in which everything sells, but runs an increased risk that makegoods are needed. Capping the amount of sell to less than 100% (e.g., in each avail) may reduce the risk of needing to do makegoods but runs the risk that some of the inventory does not get sold. Alternatively and/or additionally, the system may allow a seller to set under- and over-allocation limits for campaigns in the context of that campaign's budget and/or its desired number of expected impressions. Practically, when it may be impossible to exactly fulfill a campaign's request, this under- and over-fulfillment of a request's parameters is typically necessary.

In one aspect of campaign control, the system may provide preferential treatment or priority of buyers by dividing buyers into different classes. The optimizer may treat buyers in different classes preferentially in a variety of ways, including, but not limited to: (1) by activating or deactivating expressiveness constructs for the use by a buyer during the campaign request or quote request creation process, (2) by giving preference to a buyer in tie-breaking situations over buyers of a lower class, (3) by giving a buyer access to subsets or supersets of inventory, (4) by optimizing, for example, in a separate batch a buyer's requests with similarly-classed buyers' campaign requests and/or quote requests, possibly before or after other batches of campaign requests and/or quote requests, and (5) by activating or deactivating a buyer's ability to submit quote requests of different types or by increasing or decreasing the number of quote requests a buyer is allowed to be submitted (thereby limiting the "fishing" that can be done by buyers to probe the system for underpriced inventory).

In one embodiment, the system may give a premium class of buyers the ability to express exclusivity rights over buyers of the same or different classes. For example, a very large buyer with a long history with the system—a premium buyer—could request that any campaign from a competitor not be allocated spots within the same pod, show, market, network, daypart, etc. Alternatively and/or additionally, when a buyer may only wish for at most one (or exactly one) of his campaign requests to be accepted, the system may allow a buyer to submit multiple exclusive campaign requests to the optimizer, and the optimizer will allow only at most one of those campaigns to win any spot. This preference can be expressed via an exclusive-or (XOR) construct, which states that either one or another campaign request, but not both, can receive a spot. In one embodiment, the system may allow multiple exclusive campaign requests from the same buyer to compete with other campaign requests from that buyer that are not under an XOR construct or campaign requests from other buyers in the batch.

In one aspect of campaign control, the system may allow a special "marketing campaign," i.e. the seller's own and its partners' promotional campaigns that must be fully satisfied despite no revenue offering. This enables advertisement operations to deliver to marketing departments what is promised. This can also be expressed from an impressions perspective, that is, guaranteed number (or percentage) of impressions against any combination of targeting attributes.

In one aspect of campaign control, the system may allow certain orders to be prioritized over others. The system can handle priorities in multiple ways, depending on the preferences of the customer. For example, the system may give Must Air (MA) orders higher priority over Should Air (SA) orders, which in turn can be prioritized over Can Shift (CS) orders.

In one aspect of campaign control, the system may provide a "what-if" analysis tool that allows user to explore optimization results under various different hypotheticals based on the inputs (such as constraints, preferences, campaign requests, etc.). By automatically exploring relaxations of various campaign controls, the optimizer can quantify the effect on the overall objective and allocation composition of the user-imposed campaign controls. For example, a user might wish to enforce a maximum of 95% of the inventory to be sold by the optimizer (to hedge against uncertainty in inventory or impressions and thus minimize future makegoods to buyers with failed campaigns), and the optimizer could automatically quantify the loss in revenue compared to selling 100% of the inventory by relaxing this campaign control. Similar relaxations or restrictions on any numeric or logical rule imposed by the seller can be performed by the optimizer to quantify the constraint's effect on overall profit or revenue or the composition of the overall allocation (who wins what, etc.). The results of "what-if" analysis can be displayed to the user in a graphical user interface.

In one aspect of campaign control, the system may also provide various forms of fairness constraints and/or preferences. In one embodiment, a campaign control or rule may require that a winning campaign gets roughly even spread of impressions across the different subsegments of the target segment, to avoid the "cream-skimming problem." For example, assume that buyer A wins impressions in the "gender=male" segment, and buyer B wins impressions in the ("gender=male" AND "income>$100k") segment. Without the extra constraints, buyer B could skim the high-income males, leaving buyer A with the low-income males, which is not intended by buyer A in his campaign request offer. Now with these "even spread of impressions" constraints, buyer A would get a reasonable spread of impression across both high- and low-income males.

In some embodiments, the system may allow the buyer or seller to identify one or more audience segments (e.g., sets of audience members defined by common age ranges, sex ranges, geographic locations, income, or other demographic criteria, or based on other criteria such as temporal, behavioral, or geographic criteria, social network connectivity, recorded actions, or other criteria), and perform the allocation so that media assets are presented to at least a threshold number of audience members who are within a specified segment.

In one aspect of campaign control, the system may also use other constraint variations. While typically ads of different advertisers from the same product category are not to be placed in the same break due to the separation constraints, it is quite common to see multiple creatives from one advertiser being shown in a break, which may lead to undesirable results. In a non-limiting example, the system may support a constraint that some, or all, orders be precluded from having multiple ads from one advertiser in one break, thus solve the above mentioned problem. In another non-limiting example, the system may support an "interconnect-supernetwork hybrid" type contract. They are all interconnect (IC) orders, but each of them requests multiple zones (which are normal) and multiple networks.

In another aspect of campaign control, the system may have access to at least some digital media assets that include dynamic content with variable components that can be selected at the time the campaign is presented to audience members based on one or more dynamic constraints or preferences (such as which ad, in isolation, would be most valuable to show). For example, the dynamic content may include content that can be changed at the time of presentation, or groups of content alternatives that may be selected at the time of presentation. The dynamic content may be associated with metadata, and the system may select one or more of the variable components dynamic content for presentation if it has metadata that corresponds to the dynamic constraint. The system may not include dynamic content (or individual variable components of the dynamic content) if its metadata conflicts with or does not correspond to the dynamic constraint. The dynamic constraint may be determined at the time of presentation based on user input into the system or based on metadata associated with the programming being presented. For example, a dynamic constraint for a children's program may require that the dynamic content have metadata indicating that it is appropriate for children to view. As another example, the system may use dynamic content of a media program (e.g., a sports game or news show) to dynamically decide which digital media asset to plan present with the media program in a way that honors not only content-based constraints (such as no adult ads in children's' shows) but also campaign level constraints (e.g., smoothness and non-concentration) or even allocation-level constraints (e.g., the allocation can have at most or at least k advertisers). In one embodiment, this can be done by checking whether the constraints would still be satisfied if a dynamically-selected spot were shown. In a more complex embodiment, could the system may re-optimize all, or part, of the future allocation so as to make the dynamically-selected digital media asset insertable while satisfying all the constraints, and possibly at the same time optimizing the rest of the campaign (e.g., for profit) in light of the decision of what dynamically-inserted ad was inserted (which may have changed what the optimal—e.g., profit-maximizing—way to fill the rest of the campaign is).

In one aspect of campaign control, the system may use various pricing models in optimization, such as spot rate and CPM. When inventory is sold manually on a per-spot or campaign basis by the seller to advertisers or agencies acting on behalf of advertisers, associated with each spot can be a spot rate, which is determined offline by the seller and is used to set the price for a spot, regardless of the applicability of that spot's audience to the buyer's preferences. An alternate measurement, cost per mille (CPM), associates a price with each set of one thousand viewers within a desired segment who view a creative.

The following example illustrates a difference between these two pricing methods. A spot is watched by 4000 males and 6000 females for a total audience of 10,000; its spot rate is $50.00, the CPM for the male segment is $5.00, and the CPM for the female segment is $10.00. If a campaign expressed interest in the male segment, it would be charged $50.00 for the allocation of that spot at spot rate prices, or $20.00 under CPM pricing. Similarly, if it were interested in the female segment, it would also be charged $50.00 for the allocation of that spot at spot rate prices, or $60.00 under CPM pricing. Under CPM pricing, the former campaign is charged less than the latter campaign because the spot is less valuable to the former campaign than the latter; under spot rate pricing, this level of granularity is not available and both campaigns (and any other campaign) are charged the same amount for that spot. Our media optimization can use the higher of the spot rate and CPM pricing to more efficiently monetize the available inventory. Furthermore, it considers the entire inventory at once as opposed to the current status quo of selling spot-by-spot.

Quote Request and Quote Optimization:

Returning to FIG. 3, in one embodiment, the system may optimize quote requests 312 independently from the batch optimization of campaign request 303. The quote request optimization may operate similar to campaign request optimization but with less input information. The quote optimization will provide the buyer some preliminary optimization results (based on limited input information), such as via the user interface 701 shown in FIG. 7, which may guide the buyer to subsequently submit a reasonable and realistic campaign request. In one embodiment, a quote request may specify an impression goal, but without a budget, then the system may return a quote for the minimum budget required to achieve that expected number of impressions, although this estimated budget might change between the quote request's submission and any future point in time. In optimizing a quote request that specifies an impression goal without a budget, the optimizer may drop constraint (3) aforementioned, i.e. the optimizer may not take into account the total charge of all spots allocated to each campaign.

In another embodiment, a quote request may specify a budget only. In optimizing such quote request, the optimization may ignore constraint (4) aforementioned, i.e. the optimization may not take into account the total number of planned impressions for each campaign being exactly the requested goal impressions (or within a band around the goal impressions if the seller allows for over- and/or under-allocation). The optimizer may also modify constraint (5) aforementioned in the following way: if the flight of the quote is longer than one week, the planned number of impressions in each week must fall between a minimum and a maximum fraction of the planned impressions rather than the goal impressions (which is not specified in this type of quote). As the result of optimization, the system may return the maximum number of impressions (within the quote's segment and budget) buyable in the system at the time of submission. This buyable is different from simply available because it takes profit optimization as the basis to decide what to quote, not just offering all available inventory. This number can change between the quote request's submission and its possible resubmission as a full campaign request due to fluctuations in inventory from accepting other new campaigns requests, or via different business rules expressed by the seller.

Seller and Buyer Approval and Makegoods:

Returning to FIG. 3, in one embodiment, after receiving submitted campaign requests and optimizing them, the system may present the optimized results as campaign proposals to the seller, buyer or another entity for approval 304. This may happen by direct presentation of parameters of the campaign proposal on a display device, or indirect presentation by transmitting parameters of the campaign proposal as one or more electronic data files to an electronic device of the seller. After the entity approves the campaign proposal by selecting a prompt on the user interface or sending a message in reply to the transmitted message, the system may present the campaign proposal to the a second entity (i.e., the seller if the first entity was the buyer, or the buyer if the first entity was the seller) for approval 305. In some embodiments, either or both of the first or the second entity may have a certain period of time to respond to the proposal. The system may set the length of time or allow a user to set the time period. If the time period passes without a response from the entity to whom the proposal is presented, or if the entity rejects the proposal or returns it to the system for re-allocation within the time period, the entity is no longer committed to this proposal (and the buyer will need to submit a new campaign request if he still wants such a campaign). The system would then also un-allocate the plurality of digital media assets for the second campaign from the identified digital programming files, thus freeing up the digital programming files in the inventory so that other digital media assets may be allocated to them.

Figure 8:
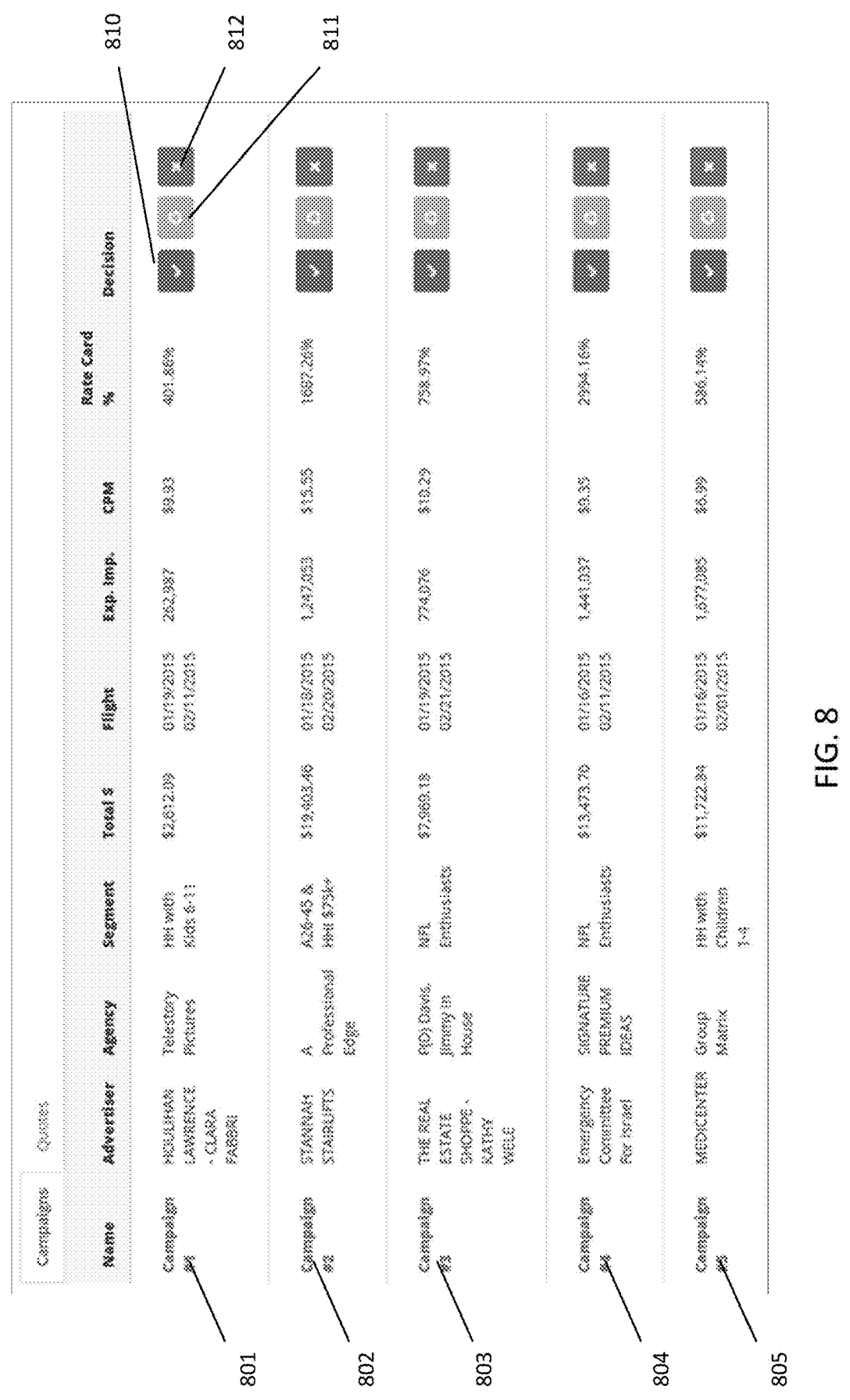

With reference to FIG. 8, the system may display a list of campaign proposals 801-805 that form a feasible, legal (i.e., consistent with applicable parameters and constraint) allocation of inventory to campaigns. The system may further display the campaign proposals in detail, such as shown in FIG. 9, with various details including, but not limited to, how many spots were won at what price for each network, daypart, and week. Returning to FIG. 8, for each of the campaign proposals, the system may display action inputs (e.g., buttons or other user-selectable prompts) to prompt the seller to select one of the three actions: approve 810, reject 812, or resubmit 811. If the seller approves a campaign proposal, then the system will treat it as a campaign and block the spots won by the campaign from being allocated to future campaigns, campaign requests, or quote requests. Alternatively, the system may present an offer to the buyer who can accept within a time frame or reject the offer (in which case the inventory is freed for later sales). If the seller rejects the campaign proposal, then the system may return the spots won to the pool of available spots to be allocated to future campaigns or requests. If the seller resubmits the proposal, then the system will queue it to the pre-optimization queue as a new campaign request, and will optimize it either individually or in a batch with other requests in the future.

If there are any outstanding campaign proposals that have not been approved, rejected, or resubmitted by the seller, in one embodiment of the system, the optimizer will not allow new campaign requests to be optimized but will allow new quote requests of either type to be optimized, this is because campaign requests will consume inventory while quote requests do not. In one embodiment, the system may optimize quotes in parallel with campaign requests, or automatically parallelize the optimization of multiple simultaneous quote requests. They system may perform this parallel optimization of campaign requests using multiple cores but working on one optimization problem. Or, this optimization can be split into multiple silos to make solving faster, but thereby compromising optimality. Furthermore, multiple users could run optimizations in parallel (for example, to better understand the market).

Alternatively and/or additionally, rather than having the seller to commit to a campaign request first, the system may allow the buyer to commit to the set of requirements entered into a campaign request. Under this circumstance, the buyer agrees to buy any campaign as long as the expressed requirements are met by the campaign proposed by the platform (which may be subject to the seller's approval).

Alternatively and/or additionally, the system may reject a campaign request in the optimization, and automatically return to the buyer possible reasons for its rejection and suggestions on changing the campaign request. In one embodiment, the system may automatically re-submit the rejected campaign as either or both quote types to identify conflicts in the campaign's expressed requirements.

After the flight of the campaign is over, the platform automatically checks, based on viewing data captured, how many impressions are actually delivered to each campaign. The system may automatically issue makegoods to, or receive manually negotiated or entered makegoods to be issued to, buyers whose campaigns have under-delivered.

Makegoods can either be in the form of future impressions, monetary value (e.g., a credit in the system or cryptocurrency), or virtual monetary value that can be used in the platform. The system may allow the buyer, in making future campaign requests, to use any type of these credits, or a combination of them, to pay for a future campaign partially or entirely.

The inventory that is being sold can be all from one seller, or can be a combination of inventory from multiple sellers. The system may allow a single campaign to run across multiple sellers. The system may also not require that a single seller include its entire inventory to be sold in the system. Furthermore, the system may support a hybrid of manual and programmatic sales into the same inventory, as described in the optimization problem earlier in this document.

Figure 10:
FIG. 10 illustrates an example of a heatmap that the system may generate.

Visualization tools: In one embodiment, the system may provide visualization tools in the form of a heatmap for past and forecasted audience composition, which is split over various dimensions like network, daypart, week, and segment. In a non-limiting example, as illustrated by FIG. 10, the heatmap 1001 may include various sectors of a display in which different cells 1002a . . . 1002n display different values associated with scopes of inventory are displayed in different colors depending on whether or not the value exceed various defined thresholds, including, but not limited to: (1) the raw number of impressions per dimension per spot (as shown in the figures), (2) the number of impressions of a certain segment type in a spot in a dimension relative to the total number of impressions per spot in a dimension, (3) options 1 or 2 visualized not overall but based on what inventory is still available (unsold), (4) the cost of a spot in a dimension under CPM pricing (described below) relative to the cost under spot rate (described below), and (5) any of the previously listed views on a per-campaign basis instead of across all campaigns or all inventory in general. The thresholds in each cell may vary, or they may be consistent across cells that present values for the same or related parameters.

Tracking and Viewer Demographics:

The system may use multiple technical components (including tracking devices included with media presentation hardware, in media servers, or in communication systems between the two that track consumers' habits at periodic time intervals (e.g., television viewers' viewing habits during particular programs or time periods—Internet-based tracking of users' browsing habits for display advertising, specialized trafficking systems in place at multi-service operators (MSOs), and cloud-based storage system and cloud-based virtual machines) to achieve to allow automation between the buy-side and sell-side, and to allow enhanced expressiveness.

In one embodiment, the system may automatically store data that captures what people watch on media device(s). In case of linear TV, this can be done via set-top boxes, specialized hardware devices that track user interactions. The system may compute and store up-to-date aggregate statistics on this data as well. For example, the system may automatically store and update data representing the available advertising inventory across multiple networks and broadcast weeks, and—via the historical viewing data capturing what people watched—forecast demographic information about the audience for each of spot in this inventory. By tracking people's viewing data, the system can track the delivered number of impressions to each committed campaign, and can deliver the analytical data to both the seller and the buyer of the campaign.

Figure 11:
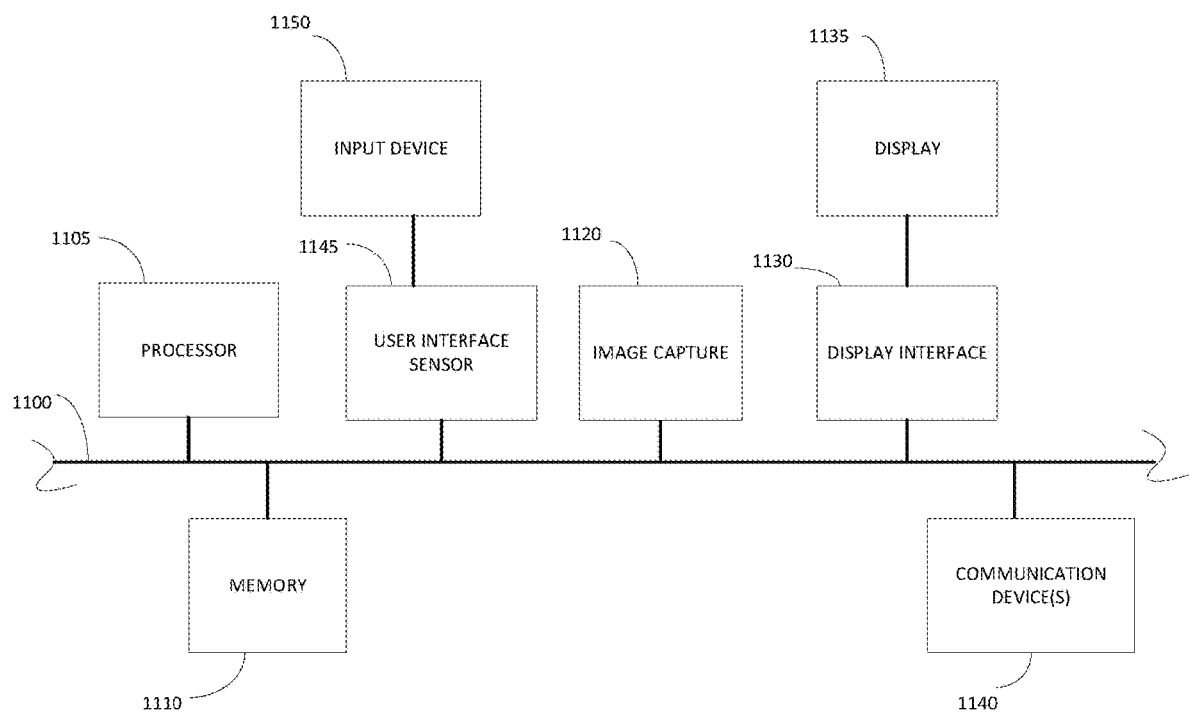
FIG. 11 is a block diagram representing internal hardware that may be used to contain or implement the various computer processes and systems discussed in this document.

In one embodiment, the system may assign viewers to one or more categories, called segments, based on their household or individual attributes (e.g., salary, interests, likely future large purchases like a house or car, ethnicity, location, family composition, and these attributes can include social attributes, social media attributes, behavioral attributes, and any other kinds of attributes). These segments can be defined by the seller and can represent any measurable aspect of a viewer or household. The system may collect and use actual demographic audience information for each of these segments from historical information. Similarly, the system may forecast the audience demographics on a per-segment basis. FIG. 11 depicts an example of internal hardware that may be included in any of the electronic components of the system, an electronic device, or a remote server. An electrical bus 1100 serves as an information highway interconnecting the other illustrated components of the hardware. Processor 1105 is a central processing device of the system, i.e., a computer hardware processor configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 1110. When this document uses terms such as "memory" or "data store", it intends to refer to one or more such devices containing non-transitory storage media. A memory device may include a single device or a collection of devices across which data and/or instructions are stored.

An optional display interface 1130 may permit information from the bus 1100 to be displayed on a display device 1135 in visual, graphic or alphanumeric format. An audio interface and audio output (such as a speaker) also may be provided. Communication with external devices may occur using various communication devices 1140 such as a transmitter and/or receiver, antenna, an RFID tag and/or short-range or near-field communication circuitry. A communication device 1140 may be attached to a communications network, such as the Internet, a local area network or a cellular telephone data network.

The hardware may also include a user interface sensor 1145 that allows for receipt of data from input devices 1150 such as a keyboard, a mouse, a joystick, a touchscreen, a remote control, a pointing device, a video input device and/or an audio input device. Data also may be received from a video capturing device 1120. The input devices and/or display device may serve as a user interface to receive input from users, such as criteria and parameters that are used in the allocation process. Example user interfaces (e.g. touch-sensitive display devices, or display devices in combination with other input devices) are shown in the various figures.

Any or all of the components described above may be integrated with, or in communication with, ore or more additional systems. For example, the system may include or be in communication with digital video insertion equipment, a traffic and billing system (e.g., those commercially available as the Eclipse™, Novar™, or WideOrbit™ traffic systems), and or a business intelligence system (e.g., those available from Decentrix™) that works in connection with a traffic system.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for automatically managing delivery of digital media assets via one or more digital media delivery services, comprising:
 a data store containing data representing available media assets to be used in one or more campaigns, wherein the media assets are stored as digital media files;
 a campaign manager processor; and
 a non-transitory computer-readable medium containing programming instructions that are configured to, when executed, cause the campaign manager processor to:
  receive a selection of one or more campaign parameters for a first campaign,
  automatically allocate a plurality of the available media assets to the first campaign according to the one or more campaign parameters and generating a scheduling file that includes the allocated media assets and one or more delivery slots for the allocated media assets,
  send the scheduling file to a media server for use in presenting the allocated media assets to media presentation devices of a plurality of consumers during the delivery slots,
  receive, from one or more of the media presentation devices via the media server, consumption data for the allocated media assets,
  analyze the consumption data to determine whether the consumption data indicates that a consumption statistic for the campaign was achieved, and
  if the consumption statistic was not achieved, automatically allocate an additional one or more of the available media assets to one or more additional delivery slots in accordance with the one or more campaign parameters; and
  generate a scheduling file that includes the additional allocated media assets and the additional one or more delivery slots, and
  send, to the media server, the scheduling file that includes the additional allocated media assets and the additional one or more delivery slots.

2. The system of claim 1, wherein each of the delivery slots comprises:
 a temporal parameter that comprises: (a) a day and time, or (b) a daypart that includes a time range within a day; and
 a media system identifier.

3. The system of claim 2, wherein the programming instructions to automatically allocate an additional one or more of the available media assets to one or more additional delivery slots in accordance with the one or more campaign parameters comprise instructions to perform the allocating so that each of the allocated additional media assets will be presented to consumers at a time that satisfies the temporal parameter of the delivery slot to which the additional media asset was allocated.

4. The system of claim 1, further comprising additional programming instructions that are configured to, when executed, cause the campaign manager processor to:
 analyze an execution state of the first campaign;
 determine an amount of the available media assets that have been delivered so far in the first campaign;
 remapping an allocation of one more of the available media assets in the first campaign; and
 sending a result of the remapping to the media server.

5. The system of claim 1, wherein:
 the programming instructions to generate the scheduling file that includes the additional allocated media assets and the additional one or more delivery slots comprise instructions to generate a scheduling file for a second campaign; and
 the programming instructions to send, to the media server, the scheduling file that includes the additional allocated media assets and the additional one or more delivery slots comprise instructions to send the scheduling file for the second campaign to the media server.

6. The system of claim 1, wherein the programming instructions to send each of the scheduling files to the media server comprise instructions to send the files to a server that serves as an intermediary between the media server and other components of the system.

7. The system of claim 1, wherein the consumption data for each of the media assets comprises a number of impressions, as well as one or more parameters about consumers who consumed the media assets.

8. The system of claim 1, wherein the programming instructions that are configured to cause the campaign manager processor to allocate the plurality of the available media assets to the first campaign comprise instructions to perform a batch optimization process by:
 identifying a desired number of impressions for the first campaign;
 identifying a desired number of impressions for a second campaign, and
 using a greedy algorithm, genetic algorithm, tree search, integer programming, simulated annealing, local search or tabu search to automatically identify a set of delivery slots in the second campaign to which the additional media assets will be allocated so that a number of impressions in the additional campaign remains consistent with an over-allocation value or an under-allocation value that represents a maximum deviation from the desired number of impressions for the additional campaign.

9. The system of claim 1, wherein:
 the programming instructions that are configured to cause the campaign manager processor to allocate the plurality of the available media assets to the first campaign comprise instructions to perform a batch optimization process by simultaneously allocating the inventory to multiple campaigns; and
 the programming instructions to simultaneously allocate the inventory to multiple campaigns further comprise instructions to:
  determine whether any candidate campaign will conflict with the selected one or more parameters, and if so reject that candidate campaign, and
  determine whether any candidate campaign will be less profitable than a different campaign with which the candidate campaign's identified digital programming files in the inventory could instead be used, and if so reject that candidate campaign.

10. The system of claim 1, wherein:
 the one or more parameters for the campaign include a smoothness constraint; and
 the programming instructions to automatically allocate the plurality of the available media assets to the first campaign according to the one or more campaign parameters comprise instructions to:
  identify a number of expected impressions for the campaign in a scope, wherein the scope is a time interval or a combination of a time interval with one or more digital media services, and allocate the media assets in the campaign to the delivery slots so that a number of impressions associated with each instance of the scope in the campaign will satisfy a threshold criterion, wherein the threshold criterion is that:

the number of impressions in the scope be not larger than a first threshold, not smaller than a second threshold, or neither larger than the first threshold nor smaller than the second threshold;

a number of impressions presented in any instance of the scope during the campaign is not disproportionately larger than a number of impressions presented in any other instance of the scope during the campaign;

a number of spots presented in any instance of the scope during the campaign is not larger than the first threshold, not smaller than the second threshold, or neither larger than the first threshold or smaller than the second threshold; or a number of spots presented in any instance of the scope during the campaign is not disproportionately larger than a number of spots presented in any other instance of the scope during the campaign.

11. The system of claim 1, further comprising additional programming instructions configured to cause the campaign manager processor to:

cause a proposal comprising parameters of the campaign to be presented to a campaign requestor for review;

identify a response time within which the campaign requestor must respond to the proposal;

if the campaign manager processor receives a positive response from the campaign requestor within the response time, cause the proposal to be presented to a second entity; and if the campaign manager processor does not receive a response from the campaign requestor to the proposal within the response time, or if the campaign manager processor receives a rejection of the proposal, then:

un-allocate the allocated plurality of digital media assets from the first campaign, and if the campaign requestor enters a prompt to do so, return the campaign request for an additional optimization process.

12. The system of claim 1, further comprising additional programming instructions configured to cause the campaign manager processor to:

receive, from a campaign requestor, a selection of one or more constraints on attributes of a target audience, wherein the attributes comprise demographic attributes, show attributes, digital media service attributes, time attributes, behavioral attributes, geographic attributes, or social attributes;

use the received parameters and the received constraints on attributes to identify an audience segment; and when performing the automatic allocation, do so such that the plurality of digital media assets in aggregate will be presented to at least a threshold number of impressions or unique impressions within the audience segment.

13. The system of claim 12, further comprising additional programming instructions configured to cause the campaign manager processor to:

receive, from the campaign requestor, an indication that the audience segment will be considered a premium target; and use the indication as an additional parameter in the automatic allocation.

14. The system of claim 11, wherein:

the indication that an audience segment that will be considered a premium target comprise user-identified additional constraints on attributes of a target audience; and the programming instructions to use the indication as an additional parameter in the automatic allocation comprise instructions to give preference to the user-identified additional constraints on attributes of the target audience in the automatic allocation.

15. The system of claim 1, wherein:

at least a subset of the media assets comprise dynamic content that includes a variable component that can be selected at the time the first campaign is presented to audience members based on one or more dynamic constraints; and the programming instructions to automatically allocate the digital media assets for the campaign to the one or more delivery slots comprise instructions to, for each of the media assets that has dynamic content:

determine whether the media asset's dynamic content satisfies the selected one or more parameters, identify a dynamic constraint of a digital programming file associated with the delivery slot to which the media asset is allocated, and determine whether the digital media asset's dynamic content satisfies the identified dynamic constraint, and only allocate that digital media asset to the delivery slot if the digital media asset's dynamic content satisfies the selected one or more parameters and the identified dynamic constraint.

16. The system of claim 15 further comprising programming instructions that are configured to cause the campaign manager processor to, after allocating any of the media assets having dynamic content that satisfies the selected one or more parameters and the identified dynamic constraint, update the automatic allocation to ensure that the campaign still satisfies the one or more parameters.

17. The system of claim 1, wherein the programming instructions to allocate the plurality of digital media assets for the campaign to delivery slots comprise instructions to perform one or more of the following:

whenever an interconnect network order for an interconnect is given a spot, provide the spot at the same time in all zones of the interconnect; or whenever an audience order for the interconnect is satisfied, provide at least the number of impressions that the audience order requested for each zone of the interconnect.

18. The system of claim 1, further comprising additional programming instructions that are configured to, when executed, cause the campaign manager processor to:

analyze the consumption data and the metadata to identify one or more additional digital programming files and future times to which to allocate additional digital media assets corresponding to a remainder of the campaign, and automatically select a plurality of the additional available media assets and allocate the selected additional available media assets to future delivery slots in accordance with the one or more campaign parameters.

19. A method automatically managing delivery of digital media assets via one or more digital media delivery services, the method comprising:

by a campaign manager processor:
- receiving a selection of one or more campaign parameters for a first campaign,
- accessing a data store containing data representing available media assets to be used in one or more campaigns, wherein the media assets are stored as digital media files,
- automatically allocating a plurality of the available media assets to the first campaign according to the one or more campaign parameters and generating a scheduling file that includes the allocated media assets and one or more delivery slots for the allocated media assets,
- sending the scheduling file to a media server for use in presenting the allocated media assets to media presentation devices of a plurality of consumers during the delivery slots,
- receiving, from one or more of the media presentation devices via the media server, consumption data for the allocated media assets,
- analyzing the consumption data to determine whether the consumption data indicates that a consumption statistic for the campaign was achieved, and
- if the consumption statistic was not achieved, automatically allocating an additional one or more of the available media assets to one or more additional delivery slots in accordance with the one or more campaign parameters,
- generating a scheduling file that includes the additional allocated media assets and the additional one or more delivery slots, and
- sending, to the media server, the scheduling file that includes the additional allocated media assets and the additional one or more delivery slots.

20. The system of claim 1, further comprising, by the campaign manager processor:
- analyzing an execution state of the first campaign;
- determining an amount of the available media assets that have been delivered so far in the first campaign;
- remapping an allocation of one more of the available media assets in the first campaign; and
- sending a result of the remapping to the media server.

* * * * *